United States Patent
Keaton et al.

(10) Patent No.: US 7,400,770 B2
(45) Date of Patent: Jul. 15, 2008

(54) METHOD AND APPARATUS FOR AUTOMATICALLY EXTRACTING GEOSPATIAL FEATURES FROM MULTISPECTRAL IMAGERY SUITABLE FOR FAST AND ROBUST EXTRACTION OF LANDMARKS

(75) Inventors: Patricia Ann Keaton, Woodland Hills, CA (US); Jeffrey Brokish, Champaign, IL (US)

(73) Assignee: HRL Laboratories, Malibu, CA (US)

( * ) Notice: Subject to any disclaimer, the term of this patent is extended or adjusted under 35 U.S.C. 154(b) by 837 days.

(21) Appl. No.: 10/704,222

(22) Filed: Nov. 8, 2003

(65) Prior Publication Data

US 2005/0100220 A1 May 12, 2005

Related U.S. Application Data

(60) Provisional application No. 60/424,479, filed on Nov. 6, 2002.

(51) Int. Cl.
*G06K 9/66* (2006.01)
(52) U.S. Cl. ...................................... 382/191
(58) Field of Classification Search .................. None
See application file for complete search history.

(56) References Cited

U.S. PATENT DOCUMENTS 5,475,766 A * 12/1995 Tsuchiya et al. ............ 382/144
5,949,914 A * 9/1999 Yuen .......................... 382/254
6,021,213 A * 2/2000 Helterbrand et al. ........ 382/128
7,212,670 B1 * 5/2007 Rousselle et al. ........... 382/173

OTHER PUBLICATIONS

D. German, B. Jedynak, "An Active Testing Model for Tracking Roads in Satellite Images," IEEE Trans. On Pattern Ana. and Mach. Intellig., vol. 18, No. 1, Jan. 1996, pp. 1-14.
H.Y. Lee, et al., "Towards Knowledge-Based Extr. of Roads from 1m-res. Sat. Images," Proc. Of IEEE SW Symp. on Image Ana. and Interp., Austin, Texas, Apr. 2000, pp. 171-176.

(Continued)

*Primary Examiner*—Matthew C. Bella
*Assistant Examiner*—Alex Liew
(74) *Attorney, Agent, or Firm*—Tope-McKay & Assoc.

(57) ABSTRACT

A system for automatically extracting geospatial features from multi-spectral imagery, suitable for fast and robust extraction of landmarks, is presented. The system comprises a computer system including a processor, a memory coupled with the processor, an input coupled with the processor for receiving imagery and user-provided geospatial features, and an output coupled with the processor for outputting the extracted landmarks. The computer system includes a region-growing system, an appending disjointed regions system, and an automatic reseeding system, which are configured to accurately and efficiently extract all regions within the input image that closely resemble the desired geospatial feature. The region-growing system is based on a level set technique, which allows for the fast and accurate extraction of a region evolved from a single user-provided seed point. By automatically reseeding the system when a growing region stops evolving, the system extracts all the desirable regions with minimum user intervention.

120 Claims, 11 Drawing Sheets

OTHER PUBLICATIONS

J.A. Sethian and R. Malladi, "An O(NlogN) Algorithm for Shape Modeling," Proceedings of the Natural Academy of Sciences, vol. 93, Sep. 1996, pp. 9389-9892.

C. Steger, "Extraction of Curved Lines from Images," Proc. Of the 13th Intl. Conf. on Pattern Recognition (ICPR), Vienna, Austria, Aug. 1996, pp. 113-125.

C. Steger, "An Unbiased Detector of Curvilinear Structures," IEEE Trans. On Pattern Analysis and Machine Intelligence, vol. 20, No. 2, Feb. 1998, pp. 113-125.

J.D. Whyatt and P.R. Wade, "The Douglas-Peuker Line Simplification Algorith," Bulletin of the Society of University Cartographers, vol. 22, No. 1, 1988, pp. 17-27.

G. Vosselman, et al. "Road Tracing by Profile Matching and Kalman Filtering," Proc. Of The WkShp. on Auto Extr. of Man-Made Obj. from A. & S.I., Birkhaeuser, 1995, pp. 265-274.

J.H. Jang, et al., "Detection of Curvilinear Structures Using the Euclidean Distance Transform," Proc. Of the IAPR Wrksp. on MVA, Chiba, Japan, Nov. 1998, pp. 102-105.

M. Fisher, et al., "Detection of Road and Linear Struct. in Low Res. Aerial Imagery Using a Multisource Knowl. Integr. Tech.," Com. Grap. and Im.Proc., vol. 15, 1981, pp. 201-223.

F. Porikili, et al, "Unsupervised Road Extraction Algorithm for Very Low-Resolution Satelite Imagery," Proc. Of the 1st Intl. Works. on PRRS, Andorra, Aug. 2000, pp. 37-42.

J.A. Sethian, "Level Set Methods and Fast Marching Methods," Cambridge University Press, United Kingdom, 1999.

J.A. Richards and X. Jia, "An Introduction to Remote Sensing Digital Image Analysis," 3rd Edition, Springer, Berlin, Germany, 1999.

B. Tso and P.M. Mather, "Classification Methods for Remotely Sensed Data," Taylor & Francis, New York, New York, 2001.

* cited by examiner

Multispectral Analysis: 600 Pan-Sharpened Road Image; 602 TVI Index Map; 604 Spectral Classification Mask (White = Manmade Regions); 606 Pan-Sharpened Water Image; 608 WI Index Map; 610 Spectral Classification Mask (White = Water Body Regions)

Multispectral Analysis: 700 Pan-Sharpened Urban Image; 702 TVI Index Map; 704 Spectral Classification Mask ( Green = Vegetation; Brown = Soil; Gray = Manmade )

Large contrast variations in road cause extraction process to terminate prematurely: 800 Image With User Specified Seed Point; 802 Initial Extracted Region; 804 Search Cone; 806 Variance/Entropy Likelihood; 808 Euclidean Distance Transformation (EDT); 810 EDT Likelihood 812 Product of Likelihoods; 814 Automatically Determined Best Reseed Points; 816 Final Extracted Region Test Cases: 900 Curved Road, 902 Busy Highway, 904 Road Network 906 Crosswalk

| Test Image | Size Pixels | Accuracy % | Precision % | Center RMS | Time (ms) |
|---|---|---|---|---|---|
| A: Curve | 2,377 | 97.0 | 96.8 | 0.55 | 67 |
| B: Highway | 20,135 | 99.2 | 95.2 | 0.30 | 484 |
| C: Network | 5,289 | 99.4 | 95.8 | 0.58 | 120 |
| D: Crosswalk | 3,611 | 97.6 | 96.3 | 0.41 | 219 |

Table 1. Road Extraction Performance

FIG. 11

METHOD AND APPARATUS FOR AUTOMATICALLY EXTRACTING GEOSPATIAL FEATURES FROM MULTISPECTRAL IMAGERY SUITABLE FOR FAST AND ROBUST EXTRACTION OF LANDMARKS

PRIORITY CLAIM

This application claims the benefit of priority to provisional application No. 60/424,479, filed in the United States on Nov. 6, 2002, and titled "Method and Apparatus for Extracting Land Features from Multispectral Imagery."

BACKGROUND

1. Technical Field

The present invention relates to the fields of image processing and image analysis. More specifically, the present invention pertains to a method and apparatus for automatically extracting geospatial features from multi-spectral imagery based on a level set technique, which is suitable for fast and robust extraction of landmarks evolved from a single seed point.

2. Discussion

With advances in remote sensing technologies, the extraction of roads and other linear features from satellite and aerial imagery has gained substantial interest in recent years. One recent technological trend is the design of accurate automated algorithms for the extraction of buildings, road networks, and other objects from multispectral imagery for purposes of intelligence gathering, urban planning, and geospatial mapping. Ground stations of the future will need to provide a user with "up to the minute" automated analysis of geospatial information. The trend in the industry is to provide semantic layers delineating roads, land use regions, and building structures onto the raw imagery data. The introduction of satellite imagery characterized by high spectral and spatial resolutions has made possible the development of new and viable approaches for the accurate and cost-effective extraction of piece-wise linear features while trying to minimize human intervention. However, in all of these applications, accuracy is a primary issue since objects of interest in the multispectral imagery can be temporarily occluded or partially occluded by other objects, or their spectral characteristics can be varied by changing lighting conditions such as shadows cast by foliage or clouds. Furthermore, there exists a need in the art for a fast and reliable system for extracting land features such as roads, lakes, buildings, rivers, and other geospatial features from images, with little or no human intervention.

In recent years, many algorithms have been proposed to extract road networks from satellite imagery such as those discussed in "An Active Testing Model for Tracking Roads in Satellite Images", *IEEE Trans. on Pattern Analysis and Machine Intelligence*, vol. 18, no. 1, January 1996, pp. 1-14 by D. German and B. Jedynak, and "An Unsupervised Road Extraction Algorithm for Very Low-Resolution Satellite Imagery", *Proc. of the 1st Intl. Workshop on Pattern Recognition in Remote Sensing (PRRS)*, Andorra, Andorra, August 2000, pp. 37-42 by F. Porikli and T. Keaton. These algorithms were developed to extract road networks from panchromatic low-resolution satellite imagery (10 meters to 20 meters per pixel) such as SPOT satellite imagery. In this type of low-resolution satellite images, the width of roads typically ranges from one pixel to five pixels, and therefore the extraction of road networks is equivalent to the detection of lines or detection of strong curvilinear structures such as those described in "Detection of Road and Linear Structures in Low Resolution Aerial Imagery Using a Multisource Knowledge Integration Technique", *Computer Graphics and Image Processing*, vol. 15, 1981, pp. 201-223 by M. Fischler, et al, "Extraction of Curved Lines from Images", *Proc. of the 13th Intl. Conf. on Pattern Recognition (ICPR)*, Vienna, Austria, August 1996, pp. 113-125 by C. Steger, and "An Unbiased Detector of Curvilinear Structures", *IEEE Trans. on Pattern Analysis and Machine Intelligence*, vol. 20, no. 2, February 1998, pp. 113-125 by C. Steger.

As more and more high resolution satellite images such as IKONOS images (one meter per pixel) become publicly available, future geographic information systems must support the exploitation of high-resolution satellite imagery. In contrast with low-resolution satellite images, where the extraction of road networks is equivalent to detection of lines, with high-resolution images the road-width can vary considerably. In addition, with high-resolution images there could be extra variations present such as lane markings, vehicles, shadows cast by buildings and trees, overpasses, and changes in surface material. These variations make the extraction of road networks a much more difficult problem. Therefore, the extraction of road networks from high-resolution satellite images requires a very different methodology than that used by the prior art to extract roads from low-resolution satellite images.

Recent, more advanced, methods for the extraction of roads from high-resolution panchromatic imagery include an automatic segmentation approach based on watersheds such as the one discussed in "Towards Knowledge-Based Extraction of Roads from 1m-resolution Satellite Images", *Proc. of the IEEE Southwest Symposium on Image Analysis and Interpretation*, Austin, Tex., April 2000, pp. 171-176 by H. Y. Lee, et al. In the watersheds method, the image is interpreted as a surface with the height proportional to the pixel intensity. The minima of this surface, which correspond to the smallest pixel intensities, are the locations where water would settle if it were poured onto the surface. Watersheds typically form an over-segmentation of the image, by segmenting or grouping together regions with similar height or pixel intensities. Therefore, road candidate regions are selected out from all the different segments by calculating the elongatedness of all the segments and, in turn, using this elongatedness calculation to detect all the rectangular regions. Finally, these rectangular road candidate regions are merged with adjacent regions based on continuing the structural properties of the road. The road continuity is accomplished by appending together road segments with similar orientations. This approach works well while extracting straight roads that do not change direction. However, when a 90 degree intersection between two road segments is encountered, or a significant bend or curve on the road occurs, the watershed algorithm requires that the user provide a new seeding point. The new seeding point is, in turn, used by the system to obtain new directional orientation information, which is then used to connect the two disjointed road segments.

The continuous "directional reseeding by the user" is greatly increased when the watershed method is used to process an image containing lighting effects due to shadows cast by foliage or clouds, or containing occlusions caused by bridges, underpasses, or foliage, since all of these conditions lead the watershed method to over segment the image. Furthermore, this problem is greatly intensified when the watershed method is used to extract rivers from multispectral imagery, due to the fact that rivers, for the most part, lack the directional continuity required by the watershed method to append disjoint river segments. Therefore, the system's response time is considerably slowed down by the constant interaction with the human operator.

Another recent method for the extraction of roads from high-resolution panchromatic imagery includes a semi-automated approach, as the one discussed in "Road Tracing by Profile Matching and Kalman Filtering", *Proc. of the Workshop on Automatic Extraction of Man-Made Objects from Aerial and Space Images*, Birkhaeuser, 1995, pp. 265-274 by G. Vosselman, and J. Knecht, which involves tracing a road utilizing a Kalman filtering approach. Given an initial point and directional information from an operator, the algorithm first extracts a crossroad profile. Then it takes progressive steps in the provided direction of the road, comparing the cross-road profile with the initial profile and adjusting the location and curvature estimates of the road, which allows for tracing of curved roads. The Kalman filter used in the update of the position estimate enables the algorithm to trace through obstructions by ignoring profile information when it deviates too far from the initial profile by using the existing local orientation and curvature estimates of the road in determining the road location. In other words, this approach continuously updates the local road curvature and orientation information while the algorithm extracts the new road segments. Thus as the road changes direction, the algorithm compares the new road segment direction with the previously updated local road direction, instead of comparing the new road segment direction with the initial road direction at the seeding point. As a result, the algorithm continues to extract the road even if the new road direction deviates too far from the initial road direction at the seeding point as long as the new segment direction is not too far from the most recently updated local road direction.

However, the method for extracting roads utilizing a Kalman filtering still breaks down when a crossroad or a 90 degree intersection between two road segments is encountered, or if a significant bend or U-curve on the road occurs, or when attempting to extract rivers from multispectral imagery. During these situations, in order to obtain new directional orientation information used to connect disjointed segments, the Kalman filtering approach requires that the user provide a new seeding point.

Other prior art techniques used to extract roads operate by finding segments within the image that contain parallel edges. Then the parallel-edged segments are compared against the desired road characteristics extracted from the initial user-provided seed point area, in order to determine which, if any, of the parallel-edged segments are part of the road. However, this method fails to extract real road segments any time the algorithm cannot detect both parallel edges of a road section, such as when an edge of the road has a weak boundary due to snow on the road, dirt on the road, or shadows from trees close to the road, all of which smooth the contrast of the edge of the road with surrounding areas. This method also fails if any of the edges of the road segment are occluded by either a car parked on the road, by a tree, or by foliage.

Most of the state of the art road extraction techniques developed to date cannot continuously grow a road network when they encounter cuts on the road created by underpasses, or change of pavement coloration, or road intersections. Therefore, these road extraction techniques require the user to provide multiple seeding points along with corresponding road directional information every time the system is not able to connect separate road segments. Thus, artisans are faced with the problem of requiring multiple seeding points provided by the user throughout the image in order to extract a complete network of roads. As a result, the system's response time is considerably slowed down by the constant interaction with the human operator. In addition, the state of the art road extraction techniques do not automatically correct any occlusions on the road caused by cars or foliage on the edge of the road, which result on inaccurate road segments being extracted.

Therefore, a system for automatically extracting roads or geospatial features from multi-spectral imagery is needed that uses a single user-provided seed point on the road of interest to grow a complete network of roads from the single user-provided seed point, and which is time efficient and effective in iteratively smoothing, refining, and reseeding the extracted region to accurately estimate the road centerline despite the presence of cars on the road, changes in the curvature of the road, changes in the pavement or surface properties of the road, or obstruction resulting from foliage or shadows cast on the road by neighboring trees. Furthermore, it is desirable that the system exploit the information provided by the high-resolution panchromatic band imagery and the four available low-resolution spectral color bands, in order to accurately extract buildings, road networks, lakes, and other objects from multispectral imagery.

For the foregoing reasons, there is a great need for a system that automatically extracts roads or geospatial features from multi-spectral imagery, suitable for fast and robust extraction of landmarks evolved from a single seed point with minimum human intervention.

The following references are presented for further background information:

[1] D. German and B. Jedynak, "An Active Testing Model for Tracking Roads in Satellite Images", *IEEE Trans. on Pattern Analysis and Machine Intelligence*, vol. 18, no. 1, January 1996, pp. 1-14.

[2] M. Fischler, et al, "Detection of Road and Linear Structures in Low Resolution Aerial Imagery Using a Multi-source Knowledge Integration Technique", *Computer Graphics and Image Processing*, vol. 15, 1981, pp. 201-223.

[3] J. H. Jang and K. S. Hong, "Detection of Curvilinear Structures Using the Euclidean Distance Transform", *Proc. of the IAPR Workshop on Machine Vision Applications (MVA)*, Chiba, Japan, November 1998, pp. 102-105.

[4] H. Y. Lee, et al, "Towards Knowledge-Based Extraction of Roads from 1m-resolution Satellite Images", *Proc. of the IEEE Southwest Symposium on Image Analysis and Interpretation*, Austin, Tex., April 2000, pp. 171-176.

[5] F. Porikli and T. Keaton, "An Unsupervised Road Extraction Algorithm for Very Low-Resolution Satellite Imagery", *Proc. of the 1st Intl. Workshop on Pattern Recognition in Remote Sensing (PRRS)*, Andorra, Andorra, August 2000, pp. 37-42.

[6] J. A. Richards and X. Jia, "An Introduction to Remote Sensing Digital Image Analysis", 3rd Edition, Springer, Berlin, Germany, 1999.

[7] J. A. Sethian, and R. Malladi, "An O(NlogN) Algorithm for Shape Modeling", *Proceedings of the National Academy of Sciences*, vol. 93, September 1996, pp. 9389-9892.

[8] J. A. Sethian, "Level Set Methods and Fast Marching Methods", Cambridge University Press, United Kingdom, 1999.

[9] C. Steger, "Extraction of Curved Lines from Images", *Proc. of the 13th Intl. Conf. on Pattern Recognition (ICPR)*, Vienna, Austria, August 1996, pp. 113-125.

[10] C. Steger, "An Unbiased Detector of Curvilinear Structures", *IEEE Trans. on Pattern Analysis and Machine Intelligence*, vol. 20, no. 2, February 1998, pp. 113-125.

[11] B. Tso and P. M. Mather, "Classification Methods for Remotely Sensed Data", Taylor & Francis, New York, N.Y., 2001.

[12] J. D. Whyatt, and P. R. Wade, "The Douglas-Peuker Line Simplification Algorithm", *Bulletin of the Society of University Cartographers*, vol. 22, no. 1, 1988, pp. 17-27.

[13] G. Vosselman, and J. Knecht, "Road Tracing by Profile Matching and Kalman Filtering", *Proc. of the Workshop on Automatic Extraction of Man-Made Objects from Aerial and Space Images*, Birkhaeuser, 1995, pp. 265-274.

SUMMARY

The present invention provides a system for automatically extracting geospatial features from multi-spectral imagery, suitable for fast and robust extraction of landmarks evolved from a single seed point, the system comprising: a computer system including a processor and a memory coupled with the processor. The computer system further comprises an input coupled with the processor for receiving multi-spectral imagery, panchromatic imagery, and user-provided desirable geospatial features or a user-provided seed point. Generally, the user-provided seed point represents a part of a desirable geospatial feature of the area of land. Furthermore, the computer system comprises an output coupled with the processor for outputting the extracted landmarks, and means residing in its processor and memory for: iteratively growing a region about the seed point; appending a selected grown region to a network of grown geospatial features; automatically reseeding a point on the image that has similar characteristics to the desirable geospatial feature; and performing iteratively the acts of growing a region about the seed point, appending, and reseeding, until either exhausting all likely candidates of potentially disjointed regions of the desired geospatial feature, or until reaching the boundaries of the image of an area of land. Moreover, the means for iteratively growing a region about the seed point is based on a level set technique, which generates a grown region with edges and a boundary. This grown region is representative of the desired geospatial feature selected by the user. Also, the means for automatically reseeding a point on the image generates a reseeding point that represents a potentially disjointed region of the desired geospatial feature of the area of land. The computer system outputs, in a computationally efficient manner, the network of grown geospatial features and any geometrical or spectral features extracted from the network of grown geospatial features.

In a further embodiment, the present invention exploits the information provided by the high-resolution panchromatic band imagery and the available low-resolution four spectral color bands by creating a pan-sharpened image, where the pan-sharpened image is created by mapping each pixel in the panchromatic image into the multispectral image, and wherein the pan-sharpened image preserves the details provided by the panchromatic data, while allowing for the exploitation of color information provided by the four-band color multi-spectral data.

Furthermore, in the means for receiving a seed point, the seed point can be either provided directly by the user selecting a desirable point within the image that is then labeled as "user-provided seed point", or by the user providing desirable geospatial features, which are then used by the embodiment of the present invention to automatically generate a seed point. In the later case, the present invention automatically searches the entire image looking for points within the image that have geospatial features that closely match the user-provided desirable geospatial features. Then, the point within the image, that has the geospatial features most closely match to the user-provided desirable geospatial features, is used as the seeding point.

In another embodiment of the present invention, the means for iteratively growing a region about the seed point uses a level set technique that utilizes a speed function to control and stop the evolution of the growing region. In general, the growing region has spectral uniformity and consistent texture, thus these features can be exploited to evolve the desired region of interest from the seed point. Therefore, the speed function is defined in terms of features that include at least one of: spectral uniformity; consistent texture; contrast with surrounding environment; Transformed Vegetative Index mask (TVI mask); and Water Index mask (WI mask). The TVI mask is a measurement of light reflectance that is computed by combining near infrared and red color band information, with specific values for the TVI mask in regions with vegetation, and other specific values for the TVI mask in man made regions. In contrast, the WI mask is another measurement of light reflectance that is computed by combining near infrared and green color band information, with specific values for the WI mask in water regions, and other specific values for the WI mask in man made regions.

In yet another embodiment, when the present invention is used to extract roads from multispectral imagery, this embodiment of the invention automatically corrects any occlusions on the road caused by cars on the road or foliage on the edge of the road, which result in inaccurate road segments being extracted. In this embodiment, the invention iteratively smoothes the edges of the grown region by using a level set technique in order to eliminate boundary irregularities in a boundary of the grown region, wherein the level set technique uses a smoothing speed function to control and stop the evolution of a growing region around the boundary irregularities of the grown region. The smoothing speed function used for smoothing the edges of the grown region is defined in terms of a curvature measurement of the boundary of the grown region, and it is designed so that the region will continue to grow into concave regions while the region will stop growing from convex regions. Therefore, the smoothing speed function removes the concavities on the grown region that were generated by objects occluding the desirable geospatial feature on the imagery. Furthermore, since the boundary of the grown region has global properties that define an overall shape of the grown region, only a finite number of iterations are performed to smooth out local irregularities in the boundary of the grown region, so that the global properties of the boundary of the grown region will remain unchanged.

Another embodiment of the present invention filters the smoothed grown region with respect to geometrical characteristics of the desired geospatial feature, in order to eliminate all the extracted grown regions that do not correspond to the desired geospatial feature. Each resulting filtered grown region has connectivity properties, and a center line that preserves the connectivity properties of the filtered grown region, with the center line having a specific orientation associated with it. Therefore, once the filtered grown regions have been found, the means for appending a selected grown region to a network of grown geospatial features appends the filtered grown regions to the network of desirable geospatial features.

In a further embodiment, when the filtered grown region reaches a "dead end," the means for automatically reseeding searches an area about the "dead end" to find a new point in the image with similar characteristics to the user-provided seed point, in order to continue the growing of the region representative of the desired geospatial feature. The particular search region about the "dead end" consists of a "cone-shaped" search region with an orientation determined by the orientation of the centerline of the filtered grown region, as the centerline approaches the "dead end." Furthermore, the characteristics used to compare the reseeding point with the user-provided seed point comprise: textural properties of the image at the reseeding point and textural properties of the image at the user-provided seed point; and distance from the reseeding point to an edge of a region grown out of the reseeding point, and distance from the user-provided seed point to an edge of the filtered grown region. This means for automatically reseeding allows the present invention to grow a complete network of roads from the single user-provided seed point, even in situations when the road encounters an underpass, or when the road is occluded by the presence of cars on the road, or obstruction resulting from foliage, or shadows cast on the road by neighboring trees.

Furthermore, the present invention can compute the geometrical features of the branches of the network of grown geospatial features, where the geometrical features of the network include at least one of: centerlines, areas, lengths, widths, shapes, and roundness values of all the branches in the network.

In a still further embodiment, when the desired geospatial features are roads, the means for filtering the smoothed grown region uses the width and length of the smoothed grown regions as criteria for accepting or rejecting the smoothed grown regions as potential candidates for real roads, which are labeled as filtered grown regions, and allows only the filtered grown regions or potential candidates for real roads to be appended to the network of desirable features. In order to append the real road segments to the network, junction analysis is performed, where only the filtered grown regions with centerlines that meet at appropriate angles within road intersections are accepted as real roads, and where filtered grown regions with centerlines that do not meet at appropriate angles within road intersections are considered false roads. Finally, the present embodiment checks the junctions of the real roads for shape regularity, wherein intersecting real roads having similar road shape properties are automatically linked together.

In yet another embodiment of the present invention, the speed function $F_{1^{st}}(x,y)$ used by the level set technique to control the growing of a region about the seed point, is defined by:

$$F_{1^{st}}(x,y) = \left(we^{-\frac{1}{2}(\hat{c}(x,y)-\overline{\mu}_0)\Sigma^{-1}(\hat{c}(x,y)-\overline{\mu}_0)^T} + (1-w)e^{-|H(x,y)-H_0|}\right) *$$

$$\frac{1}{1+|\nabla I(x,y)|^p} * e^{-|TVI(x,y)-0.8|} * e^{-|WI(x,y)-0.9|};$$

where the first term of the speed function located to the right of the equal sign denotes the spectral uniformity of the grown region, which is defined in terms of the spectral values $\hat{c}(x,y)$ of the image at the (x,y) location; the vector $\overline{\mu}_0$ containing the spectral intensities of the image at the user-provided seed point location; the parameter w that determines relative weightings between the spectral uniformity and the entropy terms representing the texture of the grown region; and the diagonal covariance matrix $\Sigma$, which is a function of the noise present in the image. The second term to the right of the equal sign denotes the consistent texture of the grown region, and it is defined in terms of the weighting parameter w; and the entropy values H(x,y) and $H_0$ corresponding to the entropy value of the image at point (x,y), and the entropy value of the image at the user-provided seed point location. The third term denotes contrast of the grown region with the surrounding environment, and it is defined in terms of the image gradient $\nabla I$, which extracts the strong edges between the boundary of the grown region and other regions. The fourth term to the right of the equal sign hinders the growth of the grown region into vegetation regions, and the last term hinders the growth of the grown region into water regions. Furthermore, the various terms of the speed function are separated by "*"s to ensure clarity, where the symbol "*" denotes multiplication.

In a further embodiment, the present invention iteratively smoothes the edges of the grown region using a level set technique that utilizes a speed function $F_{2^{nd}}(x,y)$. The speed function $F_{2^{nd}}(x,y)$ is defined in terms of the curvature measurement of the boundary of the grown region, $\kappa$, as follows:

$$\kappa = \frac{\Phi_{xx}\Phi_y^2 - 2\Phi_x\Phi_y\Phi_{xy} + \Phi_{yy}\Phi_x^2}{(\Phi_x^2 + \Phi_y^2)^{3/2}} \text{ and}$$

$$F_{2^{nd}}(x,y) = -\min(\kappa(x,y),0);$$

where the curvature of the boundary of the grown region, $\kappa$, is defined in terms of a level set function, $\Phi: \Re^2 \to \Re$, in turn, the level set function $\Phi: \Re^2 \to \Re$ is defined by $\Phi(x,y) = \pm(x,y)$, where d(x,y) denotes the smallest distance from a point (x,y) within the image to the boundary of the grown region, and the +/− signs are chosen such that points inside the boundary have a negative distance sign, and such that points outside the boundary have a positive distance sign. Furthermore, $\Phi_x$, $\Phi_y$, $\Phi_{xy}$, $\Phi_{xx}$, and $\Phi_{yy}$ denote the partial derivatives of $\Phi$ with respect to the x coordinate, the y coordinate, the x and y coordinates, the x and x coordinates, and the y and y coordinates, correspondingly.

In another embodiment of the present invention, the reseeding point is determined as a maximum likelihood point that lies within the "cone-shaped" search region about the "dead end" that most closely satisfy:

$$SeedLH(x,y) = \exp\left\{-\left|\frac{\left(\frac{\sigma(x,y)+\sigma_0}{2} + \left(\frac{H(x,y)-H_0}{2}\right)^2\right)^2}{\sigma(x,y)*\sigma_0} - 1\right|\right\}$$

$$\exp\{-|edt(x,y)-d_0|\};$$

where SeedLH(x,y) denotes the likelihood of a point (x,y) of being an appropriate reseeding point representing a part of the desired geospatial feature of the area of land; $\sigma(x,y)$ denotes the variance associated with the image at point (x,y); and $\sigma_0$ denotes variance associated with the user-provided seed point. H(x,y) denotes the entropy value of the image at point (x,y), and $H_0$ denotes the entropy value of the image at the user-provided seed point location. Further, the Euclidean Distance Transform edt(x,y) denotes the Euclidean distance between a pixel point (x,y) and the nearest edge of a region grown out of the pixel point (x,y), and $d_0$ denotes the estimated width of the previously filtered grown region which terminated at the "dead end" generating the current "cone-shaped" search region.

The features of the above embodiments may be combined in many ways to produce a great variety of specific embodiments, as will be appreciated by those skilled in the art. Furthermore, the means which comprise the apparatus are analogous to the means present in computer program product embodiments and to the acts in the method embodiment.

BRIEF DESCRIPTION OF THE DRAWINGS

The objects, features, aspects, and advantages of the present invention will become better understood from the following detailed descriptions of the preferred embodiment of the invention in conjunction with reference to the following appended claims, and accompanying drawings where:

FIG. 11 is a set of several road extraction results obtained using the present invention.

DETAILED DESCRIPTION

Figure 1:
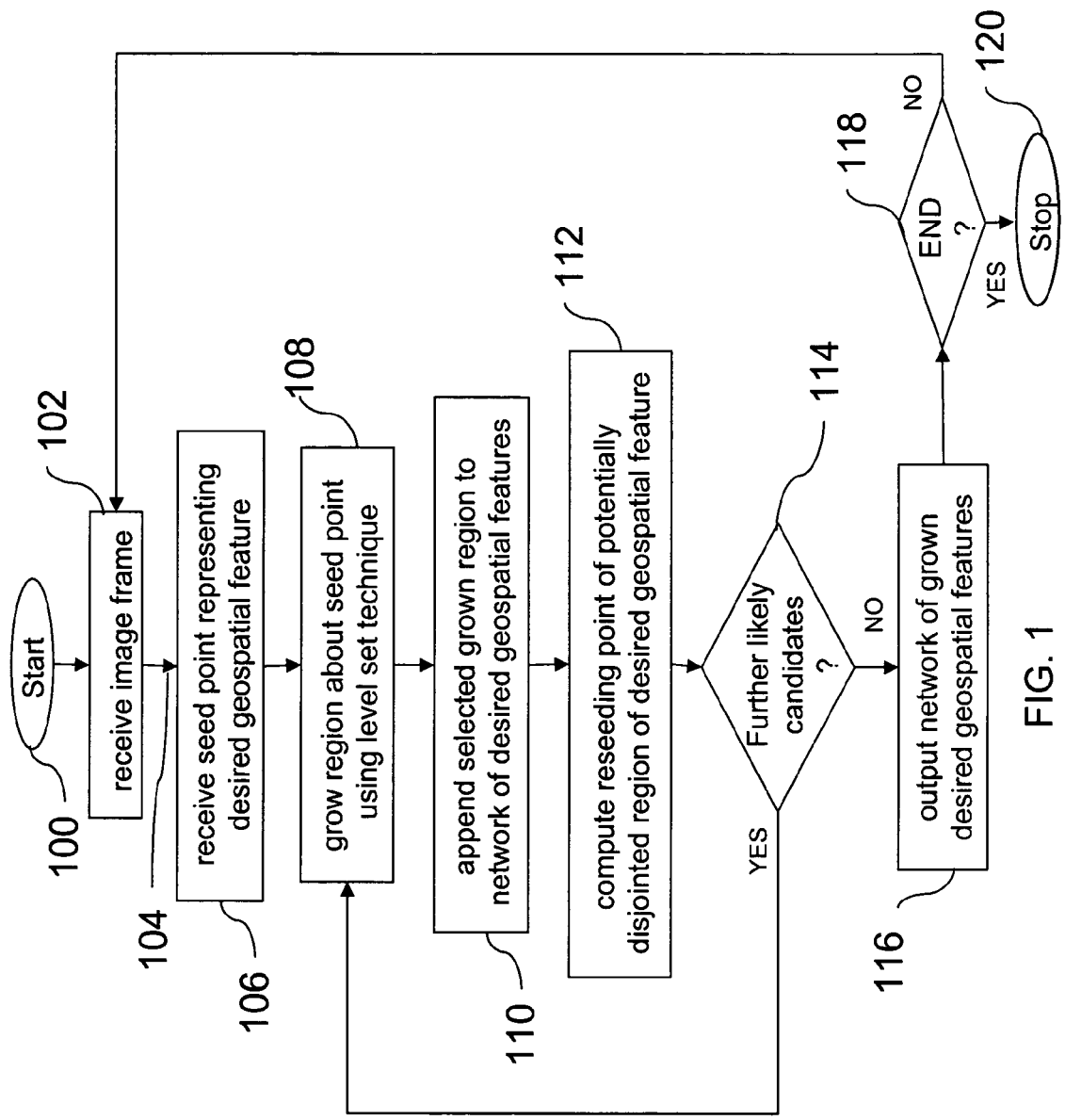
FIG. 1 is a flow chart depicting the operating acts/means/modules of the present invention.

The present invention relates to the fields of image processing and image analysis. More specifically, the present invention pertains to a method and apparatus for automatically extracting geospatial features from multi-spectral imagery based on a level set technique, which is suitable for fast and robust extraction of landmarks evolved from a single seed point. The following description, taken in conjunction with the referenced drawings, is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore it should be noted that, unless explicitly stated otherwise, the figures included herein are illustrated diagrammatically and without any specific scale, as they are provided as qualitative illustrations of the concept of the present invention.

In order to provide a working frame of reference, first a glossary of some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Then, a brief introduction is provided in the form of a narrative description of the present invention to give a conceptual understanding prior to developing the specific details.

(1) Glossary

Before describing the specific details of the present invention, it is useful to provide a centralized location for various terms used herein and in the claims. A definition has been included for these various terms. However, the definition provided should not be considered limiting to the extent that the terms are known in the art. These definitions are provided to assist in the understanding of the present invention.

ERDAS—The term "ERDAS," as used herein, is a standard term used as the name for a geographical imaging software to extract and use valuable information from any type of geographic imagery. All ERDAS software products run on the most popular computer platforms, such as: Windows NT 4.0; Windows 2000; Windows XP Professional; and most are also supported on UNIX. The ERDAS products are tightly integrated, highly customizable, and easy-to-learn-and-use. Contact information: ERDAS Worldwide Headquarters, 2801 Buford Highway, N.E., Atlanta, Ga. 30329-2137, USA. Toll free phone number from within the USA: 1-877-GO-ERDAS (463-7327).

Geospatial features—The term "geospatial features," as used herein, is a standard term used to denote the geographical spatial features characterizing an area of interest in an image.

Global Boundary Properties—The term "global boundary properties," as used herein, is a standard term used to describe the overall characteristics of the boundary of a region, which include, but are not limited to, the shape or geometry of the boundary, the overall texture of the boundary, and the coloration of the boundary.

GUI—An acronym for "Graphical User Interface." The term "GUI," as used herein, is a standard term used to denote a graphical computer interface that allows the user to interact with the computer by providing inputs or queries to the computer, and in turn receiving outputs or results from the computer.

IKONOS—The term "IKONOS," as used herein, is a standard term used as the name for an earth imaging satellite launched into space in September 1999. The IKONOS earth imaging satellite has provided a reliable stream of image data that has become the standard for commercial high-resolution satellite data products. IKONOS produces 1-meter black-and-white (panchromatic) and 4-meter multispectral (red, blue, green, near infrared) imagery that can be combined in a variety of ways to accommodate a wide range of high-resolution imagery applications.

LANDSAT—The term "LANDSAT," as used herein, is a standard term used as the name for an earth imaging satellite launched into space by NASA on Jul. 23, 1972. The first LANDSAT (land satellite) was originally called ERTS for Earth Resources Technology Satellite. For more than 25 years, the LANDSAT satellites have provided detailed observations about the surface of the planet earth. Agricultural evaluations, forest management inventories, geological surveys, water resource estimates, coastal zone appraisals, and a host of other applications have been performed with LANDSAT data to meet the needs of business, government, science and education.

Level Set Technique or Level Sets—The terms "level set technique" or "level sets," as used herein, are standard terms used to denote fast numerical methods for computing the position of propagating fronts. They rely on an initial value partial differential equation for a propagating level set function to evolve their fronts and, in addition, level sets use a speed function to control and stop the evolution of the propagating fronts or boundaries. Level set methods have been used extensively in applications involving boundary evolution, because the framework allows for cusp, corners, automatic topological changes, and accurate determination of geometric properties such as curvature and normal direction. The technique is applicable to a variety of problems, including shape-from-shading problems, lithographic development calculations in microchip manufacturing, and arrival time problems in control theory.

Local Boundary Irregularities—The term "local boundary irregularities," as used herein, is a standard term used to describe discrepancies in the overall characteristic of the boundary of a region. Specifically, in the case of extracting road regions, the local boundary irregularities comprise concavities on the grown road region created by occlusions from cars, debris, tress, foliage, snow, or created by changes in lighting conditions such as shadows cast by foliage or clouds.

Means—The term "means" when used as a noun with respect to this invention generally indicates a set of operations to be performed on a computer, and may represent pieces of a whole program or individual, separable, software (or hardware) modules. Non-limiting examples of "means" include computer program code (source or object code) and "hardcoded" electronics. The "means" may be stored in the memory of a computer or on a computer readable medium. In some cases, however, the term "means" refers to a class of device used to perform an operation, and thus the applicant intends to encompass within this language any structure presently existing or developed in the future that performs the same operation.

Multispectral Imagery—The term "multispectral imagery," as used herein, is a standard term used to denote 2-dimensional data captured at different bands of the light spectrum, resulting in a 4-meter/pixel resolution multispectral color image captured in the blue, green, red, and near-infrared bands.

On-line—The term "on-line," as used herein, is a standard term used to denote "under the control of a central computer," as in a manufacturing process or an experiment. On-line also means to be connected to a computer or computer network, or to be accessible via a computer or computer network.

Panchromatic Imagery—The term "panchromatic imagery," as used herein, is a standard term used to denote 2-dimensional high-resolution monochromatic data or gray-scale data. As a non-limiting example, the resolution of a panchromatic image is currently 1-meter/pixel, which is the highest resolution available in commercial satellite imagery today.

Real-time—The term "real-time," as used herein, is a standard term used to relate to computer systems that update information, or perform a task, at the same rate as they receive data.

Robust—The term "robust," as used herein, indicates that the system is tolerant to uncertainties such as those associated with road extraction disturbances. Generally, road extraction disturbances arise from vehicles on the road, variations present due to lane markings, considerable road-width variations, shadows cast by buildings, clouds and trees, overpasses occluding entire sections of the road, and changes in surface material. These variations make the extraction of road networks a much more difficult problem.

Seed point—The term "seed point," as used herein, is a standard term used to denote a point located within an image, which indicates a desirable focal point, a desirable location, or a desirable region within the image. In turn, the "seed point" is used to grow a region about the seed point that results on a grown region having the same geospatial features as the geospatial features characterizing the seed point.

Speed Function—The term "speed function," as used herein, is a standard term used to denote a function used by level set technique to control (speed up, slow down, or stop) the evolution of a growing region's front or boundary. The speed function can be dependent on the local or global properties of the evolving boundary or on forces external to the boundary.

TVI: An acronym for "Transformed Vegetative Index." The term "TVI mask," as used herein, generally indicates a measurement of light reflectance that has specific values for the regions within an image containing vegetation.

User—The term "user," as used herein, is a standard term used to denote a person utilizing the method for automatically extracting geospatial features from multi-spectral imagery.

WI: An acronym for "Water Index." The term "WI mask," as used herein, generally indicates a measurement of light reflectance that has specific values for the regions within an image containing water.

(2) Overview

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

Some portions of the detailed description are presented in terms of a sequence of events and symbolic representations of operations on data bits within an electronic memory. These sequential descriptions and representations are the means used by artisans to most effectively convey the substance of their work to other artisans. The sequential steps are generally those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals by terms such as bits, pixels, values, elements, files, and coefficients.

It is to be understood, that all of these, and similar terms, are to be associated with the appropriate physical quantities, and are merely convenient labels applied to these quantities. Unless specifically stated otherwise as apparent from the following discussions, it is appreciated that throughout the present disclosure, discussions utilizing terms such as "processing," "calculating," "determining," "inputting," "outputting," or "displaying" refer to the action and processes of a computer system, or similar electronic device that manipulates and transforms data represented as physical (electronic) quantities within the system's registers and memories into other data similarly represented as physical quantities within the computer system memories or registers or other such information storage, transmission, or display devices. Furthermore, the processes presented herein are not inherently related to any particular processor, processor component, computer, software, or other apparatus.

The present invention, in a preferred embodiment, provides a system for automatically extracting geospatial features from multi-spectral imagery, suitable for fast and robust extraction of landmarks evolved from a single seed point. The system includes a region-growing algorithm designed to grow a region about a seed point that represents a part of a desirable geospatial feature of an area of land. Once the region stops growing about the seed point, the system analyzes the extracted grown region to determine if the geometrical features of the grown region correspond to the geometrical features of the desired geospatial feature. When the geometrical features of the grown region and the desire geospatial feature match one another, the system selects the grown region to be appended to a network of grown geospatial regions.

In addition to growing a region from the original seed point, the system also includes an automatic reseeding point algorithm designed to compute new reseeding points for all the potentially disjointed regions within the image that correspond to the desired geospatial feature. For each new reseeding point, the system iteratively grows a region about each reseeding point, analyzes the new extracted grown region to determine its geometrical features, and selects the new grown regions that have the same geometrical features as those of the desired geospatial feature to be appended to the network of grown geospatial regions. Once no further reseeding points can be found in the image of land, the system outputs the network of grown geospatial regions containing all possible regions within the image representing the desirable geospatial region selected by a user.

For example, if a user wants to extract all the highways on a land image, the user may provide a seed point indicating a desirable focal point or location inside a highway by positioning a computer mouse above the highway and clicking one of the computer mouse buttons. The system will use this seed point to grow a region having the same geospatial characteristics as those of the seed point. Once the region stops growing about the seed point, the system will use this first grown region to represent the desirable landmark, in this example a highway, and it will compute the grown region's geometrical characteristics (e.g., the width of the highway segment). It is possible to have multiple disjointed highway segments in the image due to occlusions, since highways and roads may go through underpasses and bridges, or they may have heavy traffic. Therefore, the system will automatically look for reseeding points corresponding to disjointed segments within the image that have similar geospatial features to the original user-provided seeding point. For each new reseeding point found a new grown region is extracted (potential highway segment) and compared with the geometrical characteristics of the original segment grown (true highway segment) from the user-provided seeding point. Segments that match with the geometry (road width) of the original highway segment are appended to the network of grown highway segments. Once no further highway reseeding points can be found in the image of land, the system provides the network of extracted interconnected highways to the user.

A flow chart depicting the operating acts of the present invention is shown in FIG. 1. The blocks in the diagram represent the functionality of the apparatus of the present invention. After starting 100, an operation of receiving an image frame 102 is performed in which an image frame 104 is fed into the system by an inputting means comprised of, but not limited to, a video camera, a scanner, a fax machine, an external computer connected to the system, an internet connection, an internet web camera, a direct satellite link, a video cassette recorder (VCR), a digital versatile disc (DVD) player, or a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. Then the present invention waits for a user to provide the system with information pertaining the geospatial feature that they wish to extract from the image frame 104. In an embodiment of the invention, the user provides the system with a seeding point 106 representing the desired geospatial feature to be extracted from the image frame 104. When the seed point 106 is received, the system attempts to grow a region about the seed point using a region-growing algorithm 108 based on a level set technique, which will be discussed in greater detail below. Although this region-growing algorithm 108 based on a level set technique is discussed in greater detail below, other well-known region-growing techniques can also be used, depending on the requirements of a particular embodiment.

Once the region stops growing about the seed point 106, the grown region is analyzed to determine its geometrical features. If the geometrical features of the grown region and the desire geospatial feature match one another, the system selects the grown region to be appended 110 to a network of grown geospatial regions. Then, the system computes new reseeding points of potentially disjointed regions of the desirable geospatial feature by using an automatically reseeding means 112. If the system finds at least one new reseeding point corresponding to a further likely candidate region 114, the system iteratively grows a region about each new reseeding point, analyzes the new extracted grown region to determine its geometrical features, and selects the new grown regions that have the same geometrical features as those of the desired geospatial feature to be appended 110 to the network of grown geospatial regions.

If the system fails to find any new reseeding points corresponding to a further likely candidate region of the desired geospatial region, the system uses an outputting means 116 to provide the user with the extracted network of grown geospatial regions containing all possible regions within the image frame 104 representing the desirable geospatial region selected by the user. Once the extracted network of grown geospatial regions has been found, additional or supplementary information regarding the network may be provided to the user, such as the texture and color of the surface of the network, and the shape, centerlines, areas, lengths, widths, and roundness values of all the branches in the network. This information may be presented in visual, audio, kinesthetic, or other forms, depending on the requirements of the specific embodiment. After the additional information has been provided to the user, the system may end or continue 118, at which point it stops 120 or begins to retrieve a new image frame 102 to be analyzed.

The blocks in the flowchart of FIG. 1 may also be viewed as a series of functional modules and sub-modules, representing either software or hardware modules depending on the particular embodiment. These modules operate within the processor and memory of a general-purpose or special-purpose computer system and may be in the form of software instructions or "hard-coded" electronic circuits.

Figure 2:
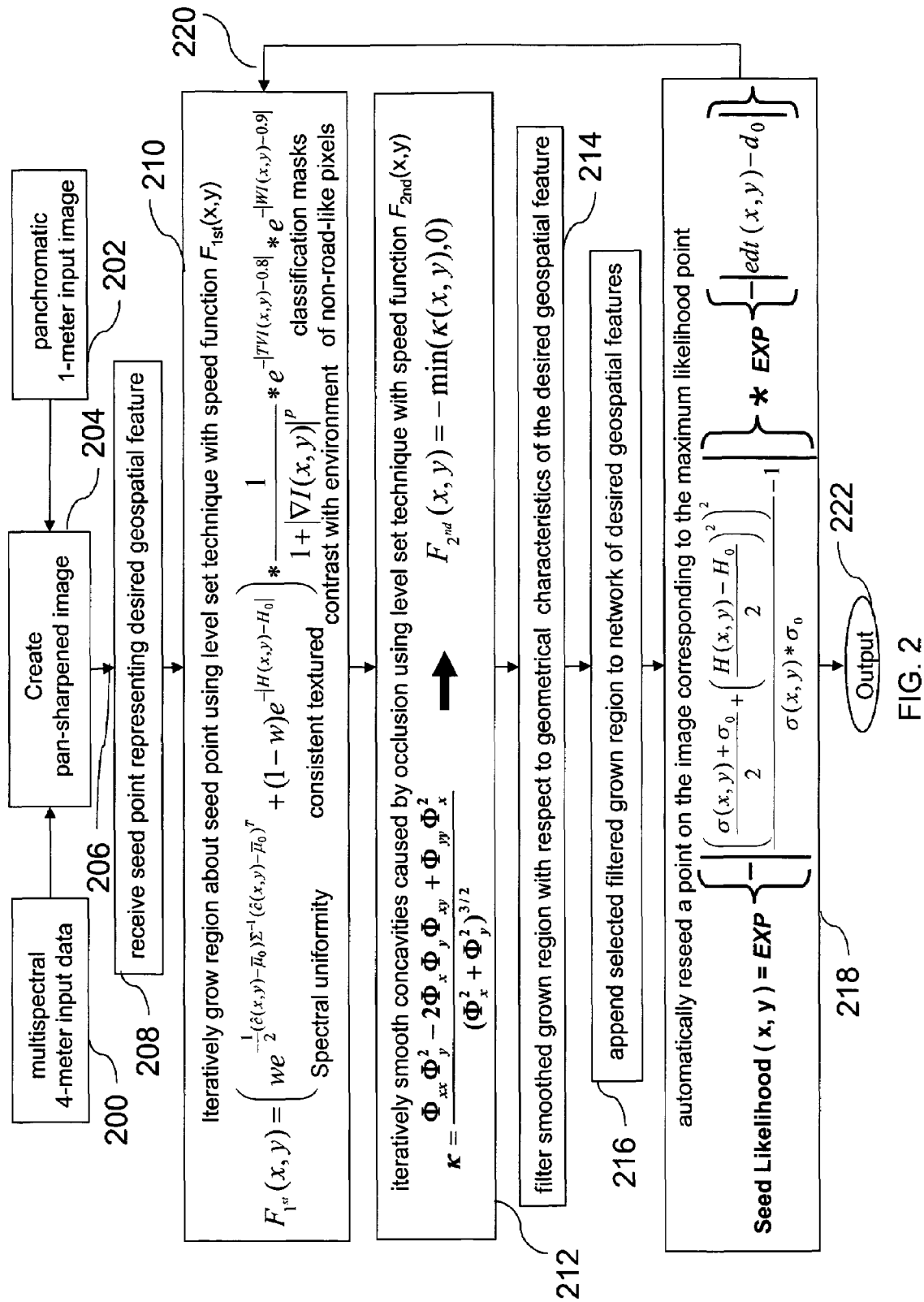
FIG. 2 is a flow chart depicting the operating acts/means/modules of a second embodiment of the present invention.

In another embodiment of the present invention, a semi-automated method for the extraction of geospatial features from high-resolution (1-meter) pan-sharpened multispectral imagery is presented, as set forth schematically in FIG. 2. After starting, a multispectral version of an image frame 200 and a panchromatic version of the same image frame 202 are inputted into the system. Then, this embodiment exploits the information provided by the high-resolution panchromatic band imagery 202 and the available low-resolution four spectral color bands imagery 200 by creating a pan-sharpened image 206, where the pan-sharpened image 206 is created by 204 mapping each pixel in the panchromatic image into the multispectral image, and wherein the pan-sharpened image preserves the details provided by the panchromatic data, while allowing for the exploitation of color information provided by the four-band color multi-spectral data. Once the pan-sharpened image 206 has been created, a user provides an initial seed point 208 on top of the geospatial feature of interest inside the pan-sharpened image 206, or the multi-spectral image 200, or the panchromatic image 202. Then, this embodiment iteratively grows a region about the seed point inside the pan-sharpened image 206 using a level set technique 210, which utilizes a speed function, $F_1^{st}(x,y)$, to control and stop the evolution of the growing region.

In general, the desired geospatial feature has spectral uniformity and consistent texture. Thus, these features can be exploited to evolve the desired region of interest from the seed point. The speed function $F_1^{st}(x,y)$ is therefore defined in terms of features that include at least one of: spectral uniformity; consistent texture; contrast with surrounding environment; Transformed Vegetative Index mask (TVI mask); and Water Index mask (WI mask). Where, the TVI mask and the WI mask are classification masks of non-road-like regions that are used to hinder the growth of the grown region into vegetation regions, and into water regions, correspondingly. The spectral uniformity of the grown region is defined in terms of the spectral values $\hat{c}(x,y)$ of the image at the (x,y) location; a vector $\bar{\mu}_0$ containing the spectral intensities of the image at the user-provided seed point location; the parameter w that determines relative weightings between the spectral uniformity and the entropy terms representing the texture of the grown region; and the diagonal covariance matrix $\Sigma$, which is a function of the noise present in the image. Further, the consistent texture of the grown region, is defined in terms of the weighting parameter w, and the entropy values $H(x,y)$ and $H_0$, which correspond to the entropy value of the image at point (x,y), and the entropy value of the image at the user-provided seed point location. Next, the contrast of the grown region with the surrounding environment is computed using the image gradient $\nabla I$, which extracts the strong edges between the boundary of the grown region and other regions.

Once the region of interest has been grown iteratively about the seed point using the level set technique 210, this embodiment of the invention automatically corrects any occlusions on the grown region caused other objects on the image or by changes in lighting conditions. Thus, the embodiment iteratively smoothes any concavities present on the grown region 212 using a level set technique that utilizes a speed function $F^{2nd}(x,y)$. This speed function $F_2^{nd}(x,y)$ is defined in terms of the curvature measurement of the boundary of the grown region, $\kappa$. Further, the curvature $\kappa$ is computed from a level set function, $\Phi$, defined by $\Phi(x,y)=\pm d(x,y)$, where $d(x,y)$ denotes the smallest distance from a point (x,y) within the image to the boundary of the grown region, and the +/− signs are chosen such that points inside the boundary have a negative distance sign, and such that points outside the boundary have a positive distance sign. $\Phi_x$, $\Phi_y$, $\Phi_{xy}$, $\Phi_{xx}$, and $\Phi_{yy}$ denote the partial derivatives of $\Phi$ with respect to the x, y, xy, xx, and yy coordinates.

Once the grown region has been smoothed removing local concavities caused by occlusion using a level set technique 212, the smoothed grown region is analyzed to determine its geometrical characteristics. Then, the system filters the smoothed grown region with respect to its geometrical characteristics 214 in order to eliminate all the extracted grown regions that do not correspond to the desired geospatial feature. If the geometrical characteristics of the grown region and the desired geospatial feature match one another, the system selects the filtered grown region to be appended 216 to a network of grown geospatial regions.

Next, the system automatically computes new reseeding points for all of the potentially disjointed regions of the desirable geospatial feature 218. The means for automatically reseeding 218 searches an area about the point where the filtered grown region reaches a "dead end" in order to find a new point in the image with similar characteristics to the user-provided seed point. The characteristics used to compare the reseeding point with the user-provided seed point comprise: textural properties of the image at the reseeding point and textural properties of the image at the user-provided seed point; and Euclidean Distance Transform edt(x,y) which is the distance from the reseeding point to an edge of a region grown out of the reseeding point; and the distance $d_0$ from the user-provided seed point to an edge of the filtered grown region.

If the system finds at least one new reseeding point corresponding to a further likely candidate region, the invention iterates back 220 to grow a region about each new reseeding point 210, to smooth the grown region 212, to filter the new extracted grown region with respect to the geometrical characteristics of the new grown region 214, and to select the new grown regions that have the same geometrical features as those of the desired geospatial feature to be appended 216 to the network of grown geospatial regions. Furthermore, if the system fails to find any new reseeding points corresponding to a further likely candidate region of the desired geospatial region, the system outputs 222 the extracted network of grown geospatial regions, which contains all the possible regions within the image representing the desirable geospatial region selected by the user.

(3) Physical Embodiments of the Present Invention (Detailed Description of the Elements)

The present invention has three principal "physical" embodiments. The first is an apparatus for automatically extracting geospatial features from multi-spectral imagery, suitable for fast and robust extraction of landmarks, typically but not limited to a computer system operating software in the form of a "hard-coded" instruction set.

This apparatus may also be specially constructed, as an application-specific integrated circuit (ASIC), or as a readily reconfigurable device such as a field-programmable gate array (FPGA). The second physical embodiment is a method, typically in the form of software, operated using a data processing system (computer).

The third principal physical embodiment is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These (aspects) embodiments will be described in more detail below.

Figure 3:
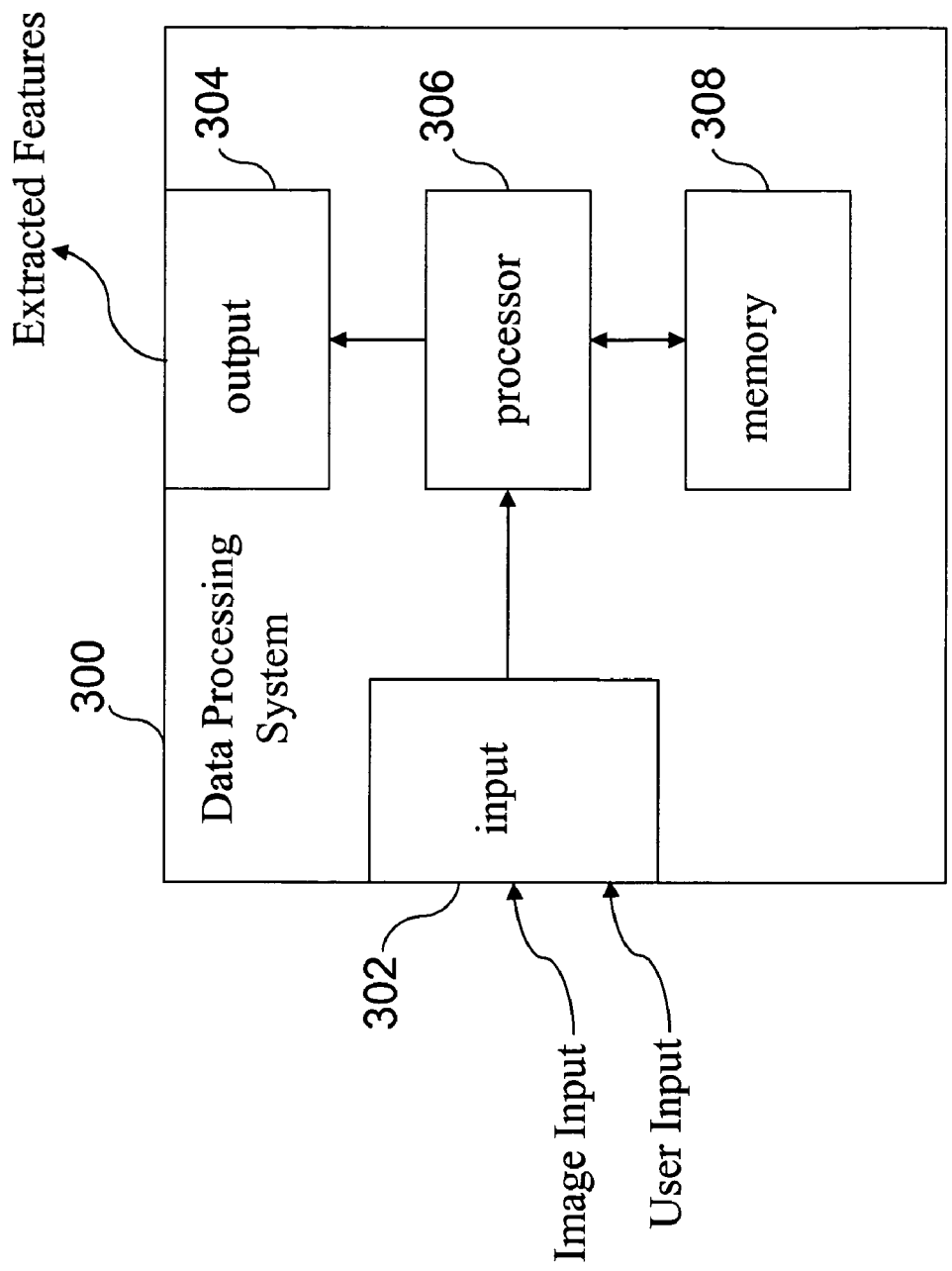
FIG. 3 is a block diagram depicting the components of a computer system used with the present invention.

A block diagram depicting the components of a computer system used in the present invention is provided in FIG. 3. The data processing system 300 comprises an input 302 for receiving images from an inputting means, video camera or any computer readable medium such as a floppy disk, Compact Disk (CD), a Digital Versatile Disk/Digital Video Disk (DVD), and a removable hard drive. The input 302 may also be configured for receiving user input from another input device such as a microphone, keyboard, or a mouse, in order for the user to provide information to the system characterizing the geospatial feature that he wishes to extract from the input image. Note that the input 302 may include multiple "ports" for receiving data and user input, and may also be configured to receive information from remote databases using wired or wireless connections. The output 304 is connected with the processor for providing output to the user, on a video display but also possibly through audio or kinesthetic signals (e.g., through pinching, vibrations, heat, etc.). Output may also be provided to other devices or other programs, e.g. to other software modules, for use therein, possibly serving as a wired or wireless gateway to external databases or other processing devices. The input 302 and the output 304 are both coupled with a processor 306, which may be a general-purpose computer processor or a specialized processor designed specifically for use with the present invention. The processor 306 is coupled with a memory 308 to permit storage of data and software to be manipulated by commands to the processor.

Figure 4:
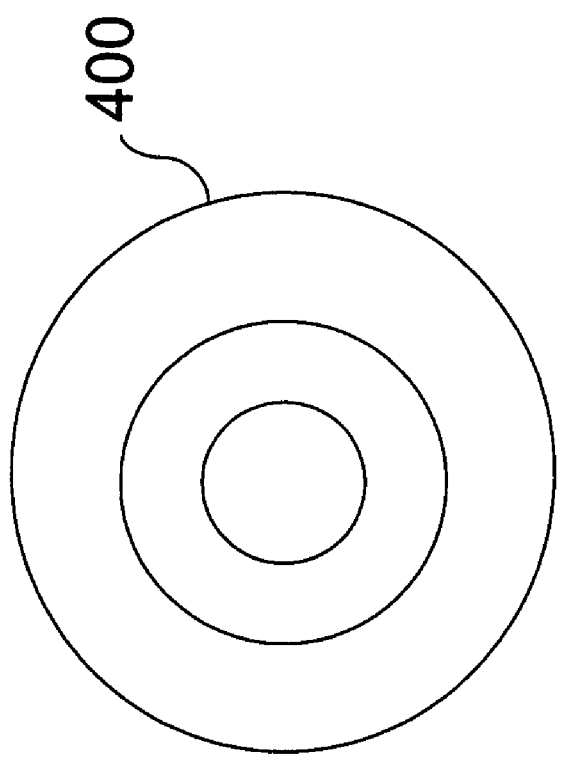
FIG. 4 is an illustrative diagram of a computer program product embodying the present invention.

An illustrative diagram of a computer program product embodying the present invention is depicted in FIG. 4. The computer program product 400 is depicted as an optical disk such as a CD or DVD. However, as mentioned previously, the computer program product generally represents computer readable code stored on any compatible computer readable medium.

(4) Detailed Description of the Elements

Figure 5:
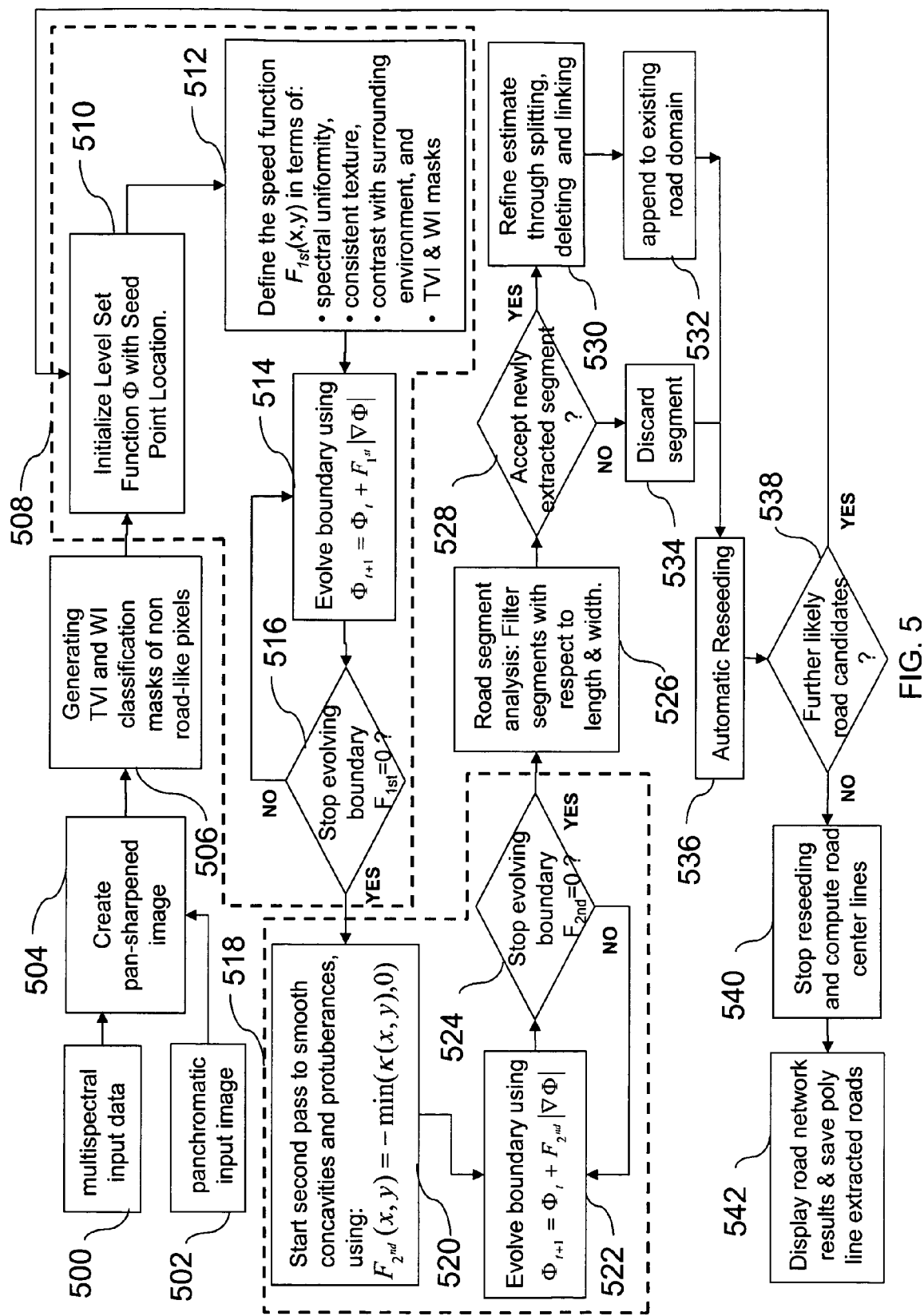
FIG. 5 is a flow chart depicting the operating acts/means/modules of a third embodiment of the present invention.

A detailed embodiment of the present invention, a semi-automated method for the extraction of roads from high-resolution pan-sharpened multispectral imagery, is presented, as set forth schematically in a flow chart shown in FIG. 5. In this detailed embodiment, the blocks in the diagram represent the functionality of the apparatus of the present invention. At the start, the system receives a multispectral version of an image frame 500 and a panchromatic version of the same image frame 502, where the terms 500 and 502 correspond to the previously described terms 200 and 202, respectively. In addition the system also receives a user provided initial seed point specifying a point on a road of interest within the image. Then, the embodiment accesses the "pan-sharpened image creation" portion of the system, in order to create a pan-sharpened image by mapping each pixel in the panchromatic image 502 into the multispectral image 500. The "pan-sharpened image creation" portion 504 corresponds the previously described element 204. Next, this embodiment uses the information in the pan-sharpened image to generate classification masks for non road-like pixels in the image by using the "generation of TVI and WI classification masks" portion of the system 506. Two non-limiting examples of such non road-like pixels on an image are the Transformed Vegetative Index mask (TVI mask) and the Water Index mask (WI mask), which are used to classify vegetation regions and water regions on an image of land.

Then the system accesses the "road extraction using a level set technique" portion of this embodiment 508 that contains the terms 510, 512, 514, and 516, which will be described in greater detail below. During the road extraction portion 508, where the element 508 corresponds to the previously described terms 108, and 210, the system uses the user-provided seed point to extract the desired road regions in the image by growing the road regions out of the seed point with a level set method. A variety of techniques may be used for this purpose, but a level set technique is preferred because the level set methods provide a powerful, fast, and efficient technique for performing feature extraction by casting the region extraction problem as a boundary evolution problem, where topological changes can be easily handled, and a priori domain knowledge (e.g., structural constraints) may be incorporated into the evolution process.

The "road extraction using a level set technique" portion 508 first initializes a level set function 510 by using information extracted from the user-provided seed point location, and second, the level set method tracks the evolution of a boundary front of the desired road region that is moving with a speed function 512 that is normal to the curve of the boundary. This speed function 512 can depend on local or global properties of the evolving boundary or from external forces. This detailed embodiment uses several image geometric and spectral properties of road networks to facilitate the extraction process within the level set framework, and thus it defines the speed function $F_1^{st}(x,y)$ 512 in terms of features that include at least one of: spectral uniformity; consistent texture; contrast with surrounding environment; Transformed Vegetative Index mask (TVI mask); and Water Index mask (WI mask). Then, the road extraction portion 508 evolves the boundary 514 of the desired road region by using the speed function $F_1^{st}(x,y)$ to control the growth of the region. Thus, when the speed function $F_1^{st}(x,y)$ has large values the boundary grows rapidly and when it has small values the growing of the boundary slows down. This process continues until the speed function $F^{1st}(x,y)$ becomes zero, and at this point the boundary of the region stops growing 516.

Once the boundary of a grown region stops evolving 516, the system uses this grown region to represent an extracted road segment, and then the system smoothes the concavities and protuberances present on this extracted road segment by using a "removal of occlusions from road segments portion" 518, where the element 518 corresponds to the previously described element 212. The removal of occlusions portion 518 contains the terms 520, 522, and 524, which will be described in greater detail later in this application. This removal of occlusions portion 518 is an iterative smoothing method based on a level set technique, which eliminates the imperfections on the extracted road and refines the extracted region to accurately delineate the road centerline despite the presence of cars on the road, changes in the pavement or surface properties of the road, or obstruction resulting from foliage or shadows cast on the road by neighboring trees. Then, this detailed embodiment performs the "road segment analysis" portion 526 on the smoothed extracted region, thus eliminating any extracted regions that do not coincide with the expected length and width of the desired road segment, where the element 526 corresponds to the previously described element 214. Next, the system decides 528 whether to accept or discard 534 the extracted road segments. The accepted road segments are then refined 530 and appended 532 to a network of desired road segments, where the element 532 corresponds to the previously described terms 110 and 216.

Once a road segment has been either appended 532 or discarded 534, the system looks for further likely road candidate regions within the image by attempting to find new seeding points with the same geospatial characteristics as the initial user provided seeding point. Thus, the system uses an "automatic reseeding" portion 536 to find new reseeding points, where the element 536 corresponds to the previously described terms 112 and 218. If further likely road candidate regions are found, as indicated by newly found reseeding points, the system iterates back to grow a region about each new reseeding point 508, smooth each extracted new region 518, analyze 526 each smoothed region to determine its geometrical features, and to select 528 each region with similar geometrical features as those of the desire road segment to be appended 532 to the network of desired road segments. On the other hand, if the system fails to find any new reseeding points, the system stops reseeding and computes the centerlines of the network of desired road segments 540, and then displays the road network results 542, where the element 542 corresponds to the previously described terms 116 and 222.

Furthermore, the "removal of occlusions from road segments portion" 518 corrects any occlusions, or concavities, on the extracted road segment, which may have been caused by other objects on the image or changes in lighting conditions, by using a level set technique that utilizes a speed function $F_2^{nd}(x,y)$ 520. This speed function $F_2^{nd}(x,y)$ 520 is defined in terms of the curvature measurement of the boundary of the grown region, κ. Then, the system evolves the boundary 522 of the extracted road segment by using the speed function $F_2^{nd}(x,y)$ in order to control the growth of the region, such that $F_2^d(x,y)$ will allow the boundary of the extracted road segment to grow into concave areas of the boundary and will not allow the boundary of the road segment to grow into the convex areas of the boundary. Finally, when the speed function $F_2^{nd}(x,y)$ becomes zero, the system stops smoothing the boundary of the extracted road segment 524.

The detailed embodiments of the various features discussed previously in the Overview section will be presented below.

a. The Pan-Sharpened Image Creation Portion

The general aspects of the pan-sharpened image creation portion were described above in relation to FIG. 2 and FIG. 5. Specifics regarding an embodiment will now be presented. In particular, detailed discussions are provided regarding the Multispectral Feature Extraction and the preferred Pan-Sharpening Procedure.

The Multispectral Feature Extraction

Current IKONOS satellite sensors provide 4-meter resolution multispectral data 500 in the blue, green, red, and near-infrared bands, and 1-meter resolution panchromatic data 502, which is the highest resolution available in commercial satellite imagery today. The 11-bit radiometry supports the development of robust feature extraction algorithms by providing discernable detail even in the presence of shadows, highlights, and low-contrast scenes. The multispectral bands approximate LANDSAT bands one through four. Therefore algorithms developed for the spectral analysis of LANDSAT data are applicable to IKONOS imagery with little or no modification. Further, It should be noted that the present invention and all of its various features can be applied to future higher resolution satellite images, as well as to any other type of images where a user wishes to extract a desired object from the image by providing a single seed point delineating the desired object, wherein the desired object exhibits spectral uniformity, consistent texture, and contrast with its surrounding environment.

a. ii. The Pan-Sharpening Procedure

The colorizing of 1-meter panchromatic pixels 502 with the 4-meter multispectral data 500 produces a pan-sharpened image, which has been shown to be very effective in both human visual interpretation of satellite imagery, as well as in automated approaches for the extraction of cartographic features from LANDSAT imagery. Hence, the present invention developed a pan-sharpening procedure 504 for the efficient exploitation of information provided by all image bands.

Each pixel in the panchromatic image 502 is mapped to a non-integral location in the multispectral image by multiplying by the resolution ratio, which in this case is ¼. The four-band source color is then calculated by interpolating the pixel values in each band using bilinear interpolation. The four-band color, $\bar{c}(x,y)$, is then viewed as a vector in color space, which is first normalized and then multiplied by the intensity given in the panchromatic image $I(x,y)$ 502. This conversion can be summarized as $$\hat{c}(x, y) = I(x, y) \frac{\bar{c}(x, y)}{\epsilon + |\bar{c}(x, y)|}, \quad (1)$$

where $\bar{c}(x,y)$ is the interpolated color value and ε is a small positive constant, used to compensate for cases where $|\bar{c}(x,y)|$ is small. The pan-sharpened image $\hat{c}(x,y)$ provides the road extraction algorithm with a rich source of information, that preserves the details provided by the panchromatic data, while allowing for the discrimination of vegetation, water and manmade surfaces. It should be further noted that the "⁻" mark and the "^" mark placed above c(x,y) as used herein, denote solely a notation to differentiate between $\bar{c}(x,y)$ the four-band color image and $\hat{c}(x,y)$ the pan-sharpened image, and these marks do not indicate an average or an estimate respectively.

b. The Generation of TVI and WI Classification Masks Portion

In the detailed embodiment where the desirable geospatial feature is usually a road or a highway, it becomes necessary to detect the areas on the image of land containing vegetation or water, since they represent non-road like regions. Therefore, this embodiment generates two distinct classification masks 506, the Transformed Vegetative Index (TVI) mask and the Water Index (WI) mask, in order to recognize vegetative regions and water regions in a multispectral image.

As seen in FIG. 5, once the pan-sharpened image has been created, this embodiment makes use of the multispectral information by generating classification masks of non-road-like pixels 506. The first pixel classification mask is based on the Transformed Vegetative Index (TVI), which is a measurement of light reflectance with specific values for the TVI mask in regions with vegetation, and other specific values for the TVI mask in man made regions. The TVI mask is computed by combining near infrared and red color band information. The second pixel classification mask is based on the Water Index (WI), which is a measurement of light reflectance with specific values for the WI mask in regions with water, and other specific values for the WI mask in man made regions. The WI mask is computed by combining near infrared and green color band information.

TVI Mask Generation

The road extraction approach of the present invention makes use of the multispectral information by generating classification masks of non-road-like pixels. Two masks are incorporated into the level set evolution function to hinder growth into non-road regions. Since the IKONOS multispectral bands approximate LANDSAT bands one through four, this embodiment can adopt classical spectral classification techniques based on a set of band ratio measures to generate the masks. The first pixel classification mask is based on the Transformed Vegetative Index (TVI), which is computed as $$TVI = \sqrt{\frac{NIR - RED}{NIR + RED} + \frac{1}{2}}. \quad (2)$$

Figure 6:
FIG. 6 is a table showing some road extraction performance results obtained using the present invention.
Figure 7:
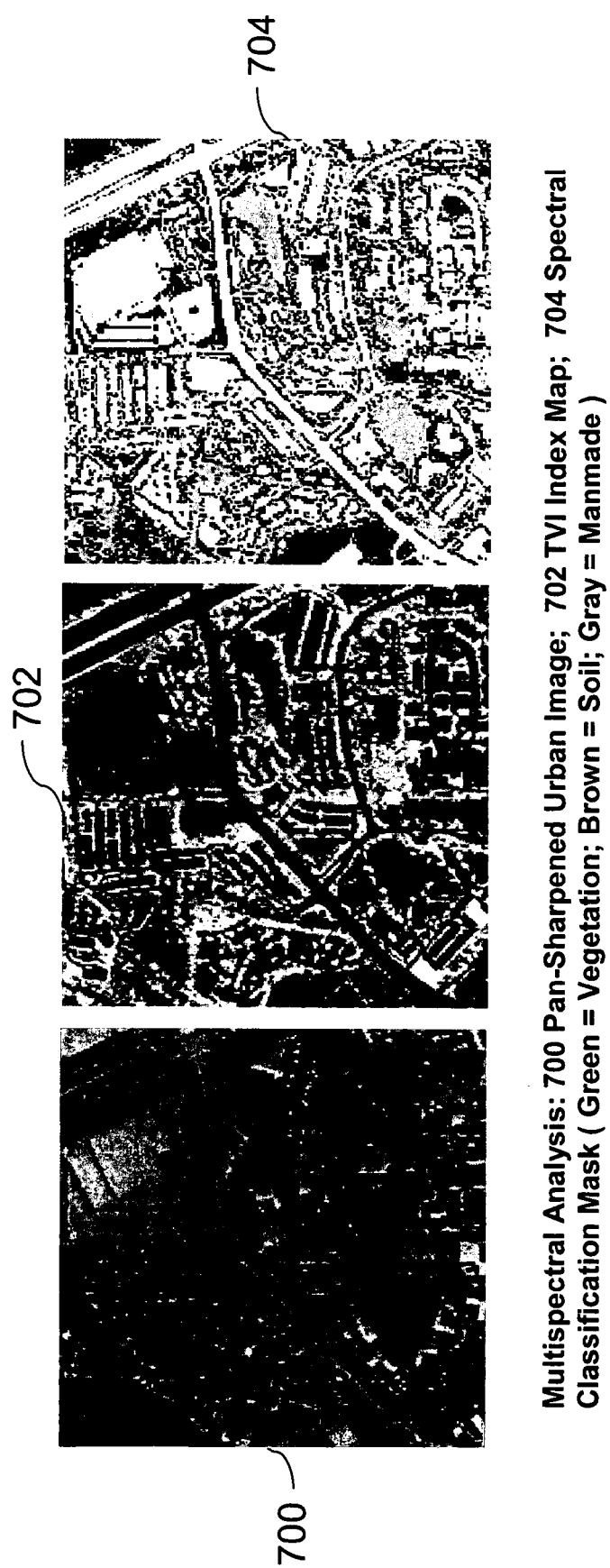
FIG. 7 is an image depicting extraction results obtained using the present invention; wherein the image illustrates pan-sharpened images, a TVI index map, a WI index map, a resulting extracted road, and a resulting extracted river.

The values of NIR and RED are the pixel values from the near-infrared and red bands, respectively. This index is based on the observation that vegetation has a high reflectance in the near-infrared band, while the reflectance is lower in the red band. The TVI value, as defined in equation (2), is small for manmade surfaces, while it is large for vegetation regions. This index is less sensitive to atmospheric conditions than other indices; therefore it has been widely used for vegetation monitoring. FIG. 6 and FIG. 7 provide examples of two pan-sharpened images containing vegetation areas on a road image 600 and on an urban image 700, their corresponding TVI Index Maps 602 and 702, and their corresponding spectral classification masks 604 and 704 generated using the TVI measure, respectively. The spectral classification mask 604 on FIG. 6 marks the manmade regions using the color white, while the spectral classification mask 704 on FIG. 7 marks the manmade regions using the color gray, the vegetation regions using the color green, and the soil regions using the color brown.

a. ii. WI Mask Generation

The second classification mask is generated by computing the Water Index (WI), which is calculated as the ratio of the pixel values of the near-infrared (NIR) and green (GRN) image bands. The Water Index (WI) is computed as follows:

$$WI = \frac{NIR}{GRN}. \tag{3}$$

Since the infrared band gives a heat signature and there is no heat emanating from water bodies, the reflectance from water surfaces is relatively low, and for wavelengths beyond the visible red band it is nearly zero. Therefore, the WI value, as defined in equation (3), is small when the region is likely to be a water body, and it is large for other types of surfaces. FIG. 6 shows an example of a pan-sharpened water image 606, the corresponding WI Index Map 608, and the spectral classification mask 610 generated using the WI measure, respectively. The spectral classification mask 610 on FIG. 6 marks the water body regions using the color white.

c. Road Extraction Using a Level Set Technique Portion

The general aspects of the road extraction using a level set technique portion 508 were described above in relation to FIG. 5. Specifics regarding an embodiment will now be presented. In particular, detailed discussions are provided regarding the Level Set Formulation and the Application of Level Sets to Road Extraction.

Level set methods have been used extensively in applications involving boundary evolution, because the framework allows for cusp, corners, and automatic topological changes. These characteristics make the level set framework a suitable choice for road extraction, since the extracted road boundary may be disjoint due to the presence of cars, possess sharp corners due to intersections, and can arbitrarily change its topology (e.g., roads may merge at any point along the road). Therefore, the present invention utilizes level set methods to extract roads from multispectral imagery, and as such, this detailed embodiment poses the road extraction problem as a boundary evolution problem within the level set framework.

Level Set Formulation

The classical level set boundary is defined as the zero level set of an implicit function $\Phi$ defined on the entire image domain. The dimensionality of the implicit function $\Phi$ is one higher than the evolving surface, which in this case for the 2-D image domain, the dimensionality of the implicit function $\Phi$ is three-dimensional. The level set method 508 tracks the evolution of a front that is moving normal to the boundary with a speed $F(x,y)$ 512. The speed function 512 can be dependent on the local or global properties of the evolving boundary or on forces external to the boundary. The level set function $\Phi: \Re^2 \to \Re$ 510 is defined such that the location of the evolving boundary, $\Phi$, and the region enclosed by the boundary, $\Omega$, are functions of the zero-level set of $\Phi$, namely:

$$\Gamma(x, y) = \begin{cases} 1 & \Phi(x, y) = 0 \\ 0 & \text{else} \end{cases} \text{ and i.} \tag{4}$$

$$\Omega(x, y) = \begin{cases} 1 & \Phi(x, y) \leq 0 \\ 0 & \text{else} \end{cases}.$$

Generally, $\Phi(x,y)$ 510 represents the signed distance function to the front. That is, $$\Phi(x,y) = \pm d(x,y), \tag{5}$$

where $d(x,y)$ is the smallest distance from the point $(x,y)$ to the true boundary where the algorithm will eventually stop at, and the sign is chosen such that points inside the boundary have a negative sign and those outside have a positive sign.

The function $\Phi$ is initialized based on a signed distance measure to the initial front. In the case of a single point this is simply the Euclidian distance to that point. The evolution of the boundary is defined via a partial differential equation on the zero level set of $\Phi$.

$$\frac{\partial \Phi}{\partial t} = -F|\nabla \Phi|. \tag{6}$$

Finally, level set methods may be easily adapted to a discrete grid implementation for efficient processing. A more detailed description on level set methods and their applications is provided in "Level Set Methods and Fast Marching Methods", Cambridge University Press, United Kingdom, 1999, by J. A. Sethian.

a. ii. Application of Level Sets to Road Extraction

The level set framework has been adapted to a number of applications beyond front propagation of physical phenomena, including the denoising of images, object recognition, and shortest path identification. Key to the success of these approaches is determining the appropriate stopping criteria for the evolution. The level set will continue to propagate 516 as long as the speed function $F(x,y) > 0$. Therefore, the speed function 512 must be properly designed such that $F(x,y) \to 0$ as the boundary approaches the desired location. For the road extraction problem, it is desirable for $F(x,y) \to 0$ at the edges of the true road boundary. To achieve this, the detailed embodiment exploits the following characteristics of roads: spectral uniformity; consistent textured surface, which is often smooth; and good contrast with surrounding environment. This leads to a speed function $F'(x,y)$ constructed as follows:

$$F'(x, y) = \left( w e^{-\frac{1}{2}(\hat{c}(x,y)-\mu_0)\sum^{-1}(\hat{c}(x,y)-\mu_0)^T} + (1-w)e^{-|H(x,y)-H_0|} \right) * \frac{1}{1+|\nabla I(x, y)|^p}. \tag{7}$$

The first term in the product of equation (7) expands the boundary to include image points based on spectral and textural similarity. It is broken down into two components. One term measures the spectral similarity of an image point $(x,y)$ to that of the seed point, which reflects the property that roads are comprised of pixels having fairly similar spectral intensities. Here $\hat{c}(x,y)$ denotes the spectral values at the image location $(x,y)$, and $\bar{\mu}_0$ represents the vector of spectral intensities of the seed point, which is compared to all other points. When the image value is close to $\bar{\mu}_0$, the spectral uniformity term tends toward 1.

The second term within the first term in the product of equation (7) measures the textural similarity between an image point (x,y) and the seed point, thus modeling the consistent smoothness of the surface of roads by matching the local entropy values. The function H(x,y) is the entropy of the image at point (x,y), and $H_0$ is the entropy of the seed point. To form the measure of entropy H(x,y), the intensities in the local neighborhood of (x,y) are histogrammed into N=64 bins, then the histogram is smoothed using a Gaussian ($\sigma$=1.0), and used to compute the standard entropy calculation:

$$H(p) = \sum_{i=0}^{N-1} p_i \log p_i, \quad (8)$$

where $p_i$ represents the value in the $i^{th}$ bin after convolution with a Gaussian. As with the spectral uniformity term, a close match in entropy will result in a value close to 1 for the textural similarity term. As the dissimilarity increases, the term $|H(x,y)-H_0|$ will decrease toward 0. The parameter w in equation (7) determines the relative weightings between the spectral uniformity or intensity term and the textural similarity or entropy term.

The second term in the product of equation (7) is a gradient-based term, which seeks to stop the evolution process at the true road boundaries. Often a road will have good contrast with its surrounding areas, thus resulting in strong edges between the road boundaries and other regions. The $\nabla I$, or gradient of the image, is large when there is high variation between neighboring values, thus denoting the presence of an edge. Therefore, the resulting edge term is such that when the gradient is small the term $$\frac{1}{1+|\nabla I(x,y)|^p}$$

evaluates near 1, but decays towards 0 as the gradient increases. The additional parameters in equation (7), p and the diagonal covariance matrix, $\Sigma$, allow for tuning the sensitivity of the two terms, and are a function of the noise and contrast present in the image.

Moreover, the classification masks generated by the multispectral analysis are incorporated into the speed function F'(x,y) by adding two additional terms designed to slow the growth into non-road-like regions. Thus, for road extraction from multispectral imagery, the speed function $F_{1^{st}}(x,y)$ 512 for the detailed embodiment of the invention becomes:

$$F_{1^{st}}(x,y)=F'(x,y)*e^{-|TVI(x,y)-0.8|}*e^{-|WI(x,y)-0.9|}, \quad (9)$$

where F'(x,y) denotes the original speed function from equation (7). The two additional factors tend toward 0 as the boundary moves into regions with large likelihoods of being vegetation or water. However these two factors only slow down the evolution of the boundary as it approaches vegetation or water; they never completely stop the evolution of the boundary since they never fully force $F_{1^{st}}(x,y)$ 512 to equal zero. Since the two indices are based on ratios of the various bands, predetermined thresholds can be effective across all multispectral data.

d. Removal of Occlusions from Road Segments Portion

The general aspects of the removal of occlusions from road segments portion 518 were described above in relation to FIG. 5. Specifics regarding an embodiment will now be presented.

One additional characteristic of roads that is not captured directly by equation (9) is the smooth continuity or slow varying nature of roads. Portions of the road may be rejected as a result of variations due to illumination or obstacles such as cars, trees, or lane markers. Therefore, once a region has been grown, a second pass 518 growing the region using level sets with a new speed function 520 is required to fine-tune the road. This second pass, which corresponds to the removal of occlusions from road segments portion 518, will smooth out any concavities or protuberances on the extracted road that resulted from illumination effects or obstacles on the road.

The level set framework provides a way of regularizing erroneous rejections due to obstacles on the road. Let $\kappa$ (x,y) be the curvature of the boundary. When the boundary is concave, $\kappa$ will be negative, and when the boundary is convex, $\kappa$ will be positive (protruding). Therefore, $F_{2^{nd}}(x,y)$ 520 should only be nonzero when $\kappa$ is negative, leading to a concavity removal equation given by:

$$F_{2^{nd}}(x,y)=-\min(\kappa(x,y),0) \quad (10)$$

Note that the speed function 520 in equation (10) will be largest at the points of highest curvature. Therefore, those parts of the boundary with higher concavity will be removed first. If this evolution is continued until a fixed-point solution is reached, all concave regions of the boundary will be removed. However, would remove all the global shape properties of the boundary, and in the case of a road turning, this would remove its true shape. Therefore, some concavity is acceptable, such as the concavity resulting from a curved road. The "local" concavity resulting from small-omitted regions that correspond to occluded regions will have a large concavity, causing those regions to be removed first. Therefore, evolving the front 522 under equation (10) for a finite number of cycles will smooth out local irregularities first without changing the global properties of the boundary.

The benefit of the level set formulation is that the curvature $\kappa$ can be computed directly from the level set function $\Phi$ via:

$$\kappa = \frac{\Phi_{xx}\Phi_y^2 - 2\Phi_x\Phi_y\Phi_{xy} + \Phi_{yy}\Phi_x^2}{(\Phi_x^2+\Phi_y^2)^{\frac{3}{2}}}, \quad (11)$$

where $\Phi_x$ denotes the partial derivative of $\Phi$ with respect to x; $\Phi_{xy}$ denotes the partial derivative of $\Phi$ with respect to x and y; and so on.

Equation (9) always reflects an outward growth and as such can be formulated in the level set framework of fast marching methods as discussed in "Level Set Methods and Fast Marching Methods", Cambridge University Press, United Kingdom, 1999, by J. A. Sethian, leading to a very efficient implementation. The smoothing outlined in equation (10) however, cannot be implemented in such a manner, owing to the variation of the local curvature computation, $\kappa$, over time. Instead of resulting in a full level set implementation, it is possible to improve the execution time of this embodiment by evolving the level set only in the neighborhood of the boundary of the region. Therefore, the implementation of this detailed embodiment of the present invention is based on this two-stage extraction process in order to provide fast and efficient extraction of roads.

e. Road Segment Analysis Portion

After a region has been extracted and smoothed, the invention estimates the centerline of the smoothed region by using a skeletonization procedure, which preserves the connectivity of the original extracted domain. Junction analysis is then performed to ensure that the road centerlines meet at appropriate angles within intersections. This is accomplished by computing the angular texture signature at points lying within the intersection. For each angle, this embodiment computes the variance over a rectangular region extending from the pixel in the angular direction. At the true intersection point, the angular texture signature will exhibit a distinct set of peaks indicating the number of roads that meet at that point. Intersecting road segments having the same road properties are then automatically linked 530.

The extracted centerlines form a network of roads, which can be represented as a graph. Here the intersections are the vertices of the graph and the edges are the road centerlines. Before each segment of an extracted road network is accepted 528, an analysis is performed 526 to determine the likelihood that the extracted region represent true road segment. Here the present invention exploits two additional properties of roads: continuity of width and appreciable length.

The length constraint is easily implemented by removing all roads that fall below a certain threshold. Thus, the algorithm used by the detailed embodiment eliminates extracted segments of length less than 5 pixels. Furthermore, in order to increases the robustness of the algorithm to the presence of poorly defined road boundaries (i.e., poor contrast between the road and its surrounding environment) a width constraint is applied to the algorithm. The application of a width constraint is much more complex than the application of a length constraint, however the level set formulation provides a direct way to estimate the width of the road, since the level set function $\Phi$ represents the distance to the boundary, and the estimated width of the road is simply $|\Phi(x,y)|$ for a point $(x,y)$ on the estimated centerline.

In the detailed embodiment, the width constraint is used in two ways to detect spurious segments. First, the road width must not vary rapidly over its length. Second, at an intersection the roads should all maintain similar widths. While the second constraint is not true in all situations, for example a highway and its on-ramp, for the most part this assumption is a correct even for urban road networks. Spurious regions that are extracted due to curve propagation beyond the road boundary, will generally fail both properties, since the resulting region that is extracted tends to be more textured and lacking the parallel edge structure of a typical roadway. Road estimates that have large variations in width or that are not consistent with the other roads present at an intersection are considered to be noise segments, and are thus removed 534. This is accomplished by pruning the edge in the corresponding road network graph. Any disconnected components that result from this pruning are removed as well.

f. Automatic Reseeding Portion

In some cases, there are large contrast variations internal to the road. These can arise from objects on the road, such as cars, centerline markers, or crosswalks, as well as due to illumination or spectral variances due to the pitch of the road or shadows cast onto the road surface. When the object is small relative to the width of the road, the level set algorithm is able to propagate around such objects, and then seal off the resulting hole during the removal of occlusions portion 518 of the present invention (smoothing phase). However, when the object is large, perhaps covering the entire width of the road, it is not possible for the evolution of the level set algorithm to propagate around such an obstacle. Additionally, a large spectral variance creates artificial edges within the roadway and, even though when these spectral variances extend only partially across the road the algorithm can again propagate around and then reabsorb such regions, when the contrast is large the algorithm cannot propagate around such regions. Therefore, when the contrast is large, there is a tradeoff between the sensitivity of the algorithm to changes in the spectral and contrast characteristics, and the accuracy of the algorithm for finding the road. If the sensitivity is too high, then small spectral variations will stop the extraction process, thus causing the road region to be over segmented into separate regions. However, if the sensitivity is too low, then the level set algorithm is prone to extending beyond the road boundaries when the edge contrast is low. Thus, it can be difficult to find the right sensitivity that can satisfy these mutually competing goals.

Figure 8:
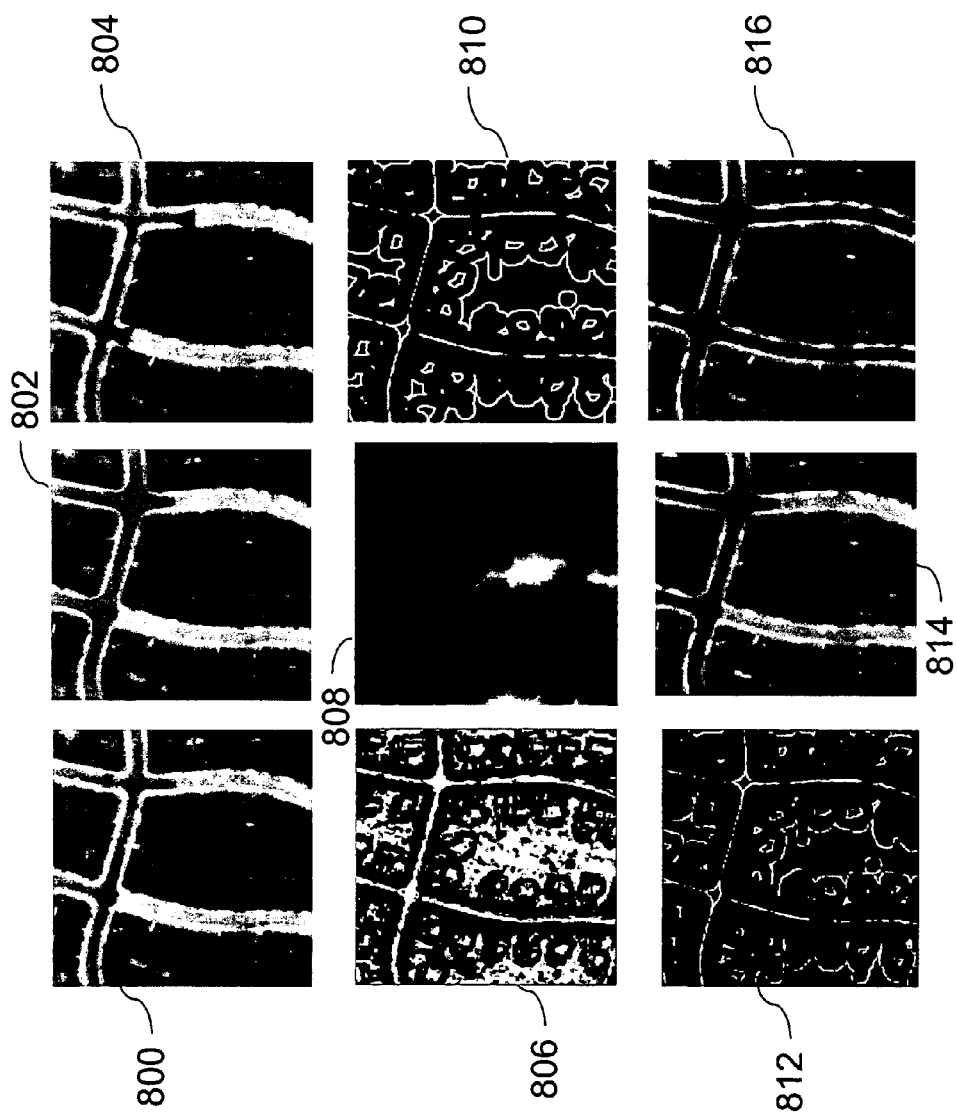
FIG. 8 is an image depicting extraction results obtained using the present invention; wherein the image illustrates a pan-sharpened image of an urban region, a TVI index map, and resulting extracted manmade regions, vegetation regions, and soil regions.

In order to find all possible further likely road regions 538 (over-segmented road regions), the present invention performs a process of automatic reseeding 536. The road centerline network provides search regions for potential reseed points due to the property that roads generally do not end abruptly, but instead form networks. The endpoints of each centerline estimate are denoted either as a connected or a dangling end, where dangling ends are those ends that do not participate in an intersection with other centerline segments. An example of a road network is shown in FIG. 8, where large contrast variations in the road, as seen in 800, cause the road extraction process 508 to terminate prematurely, thus generating dangling ends 802 on the extracted road region highlighted with a green color. The automatic reseeding algorithm 536 considers all dangling ends 802 as potential regions for automatic reseeding, and applies a cone shaped search region 804 to the end of the dangling end 802 with the orientation determined by the centerline estimate as it approaches the dangling end 802, as seen in FIG. 8.

Good reseeding point candidates are points in the neighborhood of the dangling end 802 that are similar in nature to the seed point provided by the human operator. For the particular road network example of FIG. 8, the seed point provided by the human operator can be seen towards the middle top region of 800. The reseeding points are found using two different metrics. The first metric finds neighborhoods that have similar textural properties to the seed point. Thus, the automatic reseeding portion computes a measure of similarity as the likelihood ratio test between two points:

$$LH = \frac{\left(\frac{\sigma_1 + \sigma_2}{2} + \left(\frac{\mu_1 - \mu_2}{2}\right)^2\right)^2}{\sigma_1 * \sigma_2}. \tag{12}$$

Here, $\mu$ represents the average intensity within the local neighborhood of a point, and $\sigma$ represents the local variance. When the two points are similar, this ratio is close to 1. The drawback to this function is that the average intensity, $\mu$ value, is dependent upon the intensities of pixels at that point. Since the premature termination of the extraction process can generally be attributed to the differences in the spectral characteristics, this metric will also indicate dissimilarity. Therefore, in the detailed embodiment, the automatic reseeding algorithm 536 uses an alternative intensity invariant metric, which replaces the average intensity with a measure of local entropy as given in equation (8). This substitution yields the following likelihood ratio:

$$EntrophyLH(x, y) = \frac{\left(\frac{\sigma(x, y) + \sigma_0}{2} + \left(\frac{H(x, y) - H_0}{2}\right)^2\right)^2}{\sigma(x, y) * \sigma_0}, \quad (13)$$

where $H_0$ and $\sigma_0$ are the entropy and variance associated with the seed point. Since this evaluates to 1 when the two entropies are identical, and tends towards 0 or a number much larger than 1 when the two measures are dissimilar, then the new similarity measure may be written as:

$$SpectralLH(x,y) = e^{-|EntropyLH(x,y)-1|}. \quad (14)$$

An example of the response map 806 generated by this metric is shown in FIG. 8.

The second metric of the automatic reseeding algorithm 536 uses the edge information in the image to find points that are likely to be positioned in the middle of the roadway. The currently extracted road provides an estimate of the road width. Likely continuations of the road should have similar width measures. Therefore, a good reseeding point would be a point that has a similar distance from local edges as that of the original seed point. To form this metric, the edges in the image are found using a Canny edge detector, and then the Euclidian Distance Transform (EDT) 808 of the resulting edge map is computed. The EDT finds the Euclidean distance between a pixel and its nearest edge. The EDT map 808 will have a high response at locations where parallel edges exist, as can be seen in 808 in FIG. 8, which for road images occurs at pixels comprising the road's centerlines, and its value may be used as an estimate of the road width. Thus, the similarity function with respect to edges is computed as:

$$EdgeLH(x,y) = e^{-|edt(x,y)-d_0|}, \quad (15)$$

where $d_0$ is the estimated width of the previously extracted region. This gives a strong response for points that belong to a continuation of the road centerline, as shown in 810 in FIG. 8.

The potential reseeding point is then determined as the maximum likelihood point 812 that lies within the search area at the dangling end as:

$$SeedLH(x,y) = SpectralLH(x,y) * EdgeLH(x,y). \quad (16)$$

Good seeding points will closely satisfy these two conditions. Therefore, only points with a likelihood that exceeds a set threshold are accepted for reseeding. An example of the final likelihood map is shown at reference number 812 and the best candidate reseeding points are marked with a red asterisk in 814. Then, the best candidate reseeding points 814 are provided to the road extraction using a level set technique portion 508 of the detailed embodiment, which uses this reseeding points to extract new road candidate regions. The system then removes any occlusions from the road candidate regions, and analyses them before appending them to the existing network of extracted roads, as seen in 816 in FIG. 8.

Thus, all reseeded regions are subject to further analysis before being accepted. It is possible that the road actually does end or that the reseeding location is located off of the road itself. In this case the extracted region will not correspond to the road and should not be included in the final road estimate. Generally, when the seeding point is placed outside of the road, the extracted region is either very small or is a large blob region. Therefore, the distribution on the distance of the points in the previous road estimate to that of the current road estimate may be used to decide whether or not to accept and link the newly extracted segment. If the segment is accepted, it is appended to the existing road domain 816, and the new centerline is re-estimated, as shown in 816. The reseeding process 536 continues until the image boundaries are reached, or no other likely seed points can be found.

g. Experimental Results

After the extraction process is completed, the region is prepared for display to the user. The detailed embodiment of the present invention developed a system using the ERDAS software environment, which provides a graphical user interface (GUI) development toolkit useful for creating remote sensing applications. For display purposes, the vertices of the road centerlines 540 are displayed and each segment is labeled with a particular group identification number, which represents segments of the same road network. Due to low contrast regions or large obscured sections of the road, it may not be possible to exactly extract the correct centerlines of a road network. Therefore, a GUI is provided to allow the user to refine the given estimate and form the appropriate network. The user is able to explicitly link road segments together that were not automatically linked, or to resolve road connectivity at intersections. The centerline can also be split at any point in the segment, and the user may delete any spurious segments. Finally, the user may also alter the group classification number for any segment. After successfully extracting a road segment, the system prompts the user to supply qualitative information about the roads, such as its surface type, whether it's on the ground or elevated, and whether it's in use or under construction. The road network is then displayed as the centerline vertices overlaid onto the original image.

Figure 9:
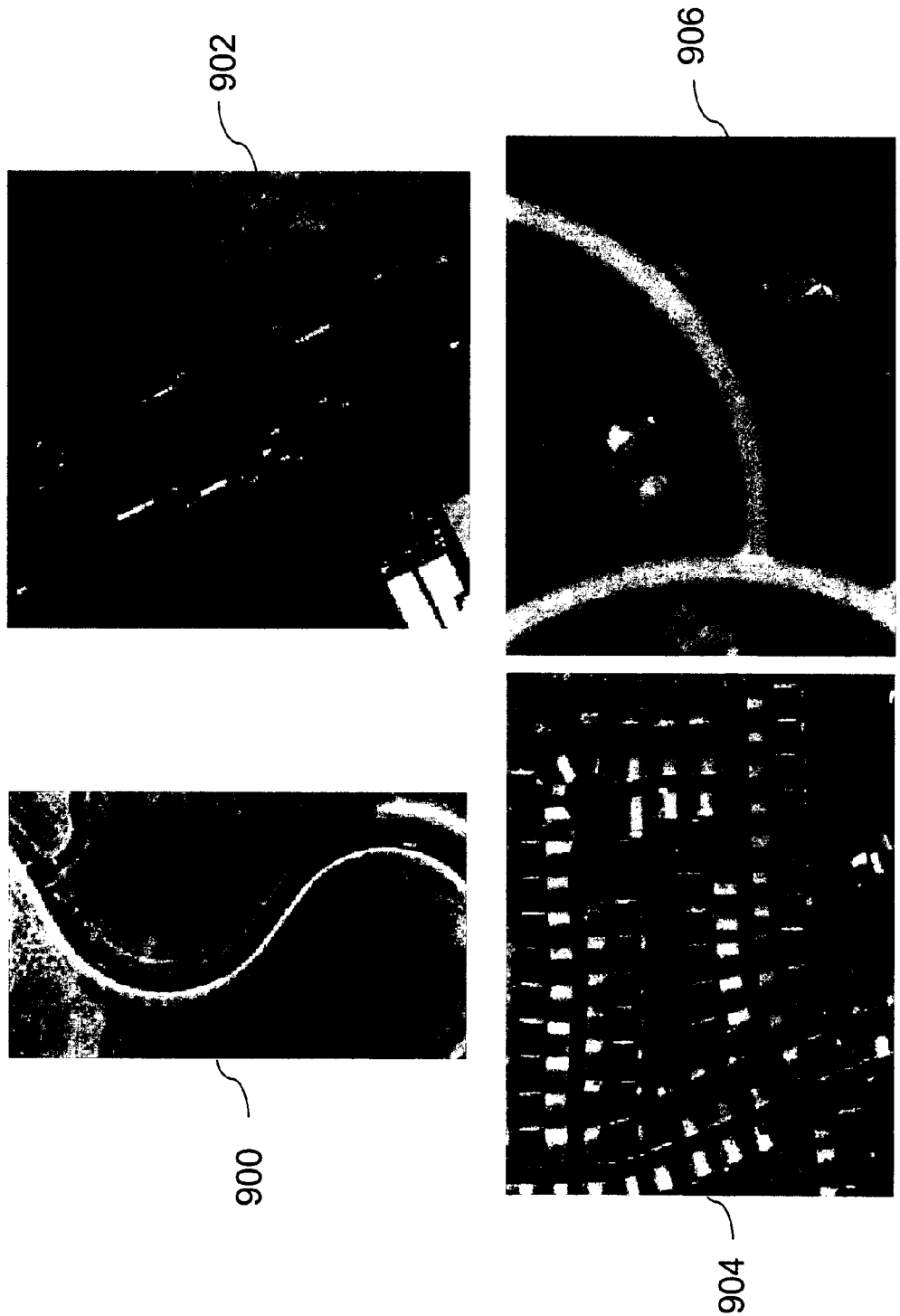
FIG. 9 is an image depicting automatic reseeding results obtained using the present invention.

The detailed embodiment was tested to extract roads on several IKONOS image samples depicting the Atlanta and Baltimore areas. The samples contained roads in both urban and rural settings as shown in FIG. 9, and were selected to demonstrate the capabilities of the detailed embodiment of the present invention. The test images used herein are provided as a non-limiting examples of the capabilities of the detailed embodiment and, as such, they are comprised of: an image depicting a curved road having a weak boundary 900, which is used to demonstrate the robustness of this embodiment to extract roads (geospatial features) with weak or blurry edges; an image of a busy highway 902, which is used to demonstrate the capability of this embodiment to extract complete roads around occluding objects; an image of a complex road network with only a single seed point provided 904, which is used to demonstrate the capability of this embodiment to extract complete complex road networks from a single user provided seed point; and an image of a 3-way intersection obstructed by a crosswalk 906. The image of a busy highway 902 is initialized using two operator-provided seed points due to the fact that the two highways are not connected, and thus do not form a network. All other cases were initialized using a single seed point. These seeds are indicated by the plus signs in the images shown in 900, 902, 904, and 906.

Figure 10:
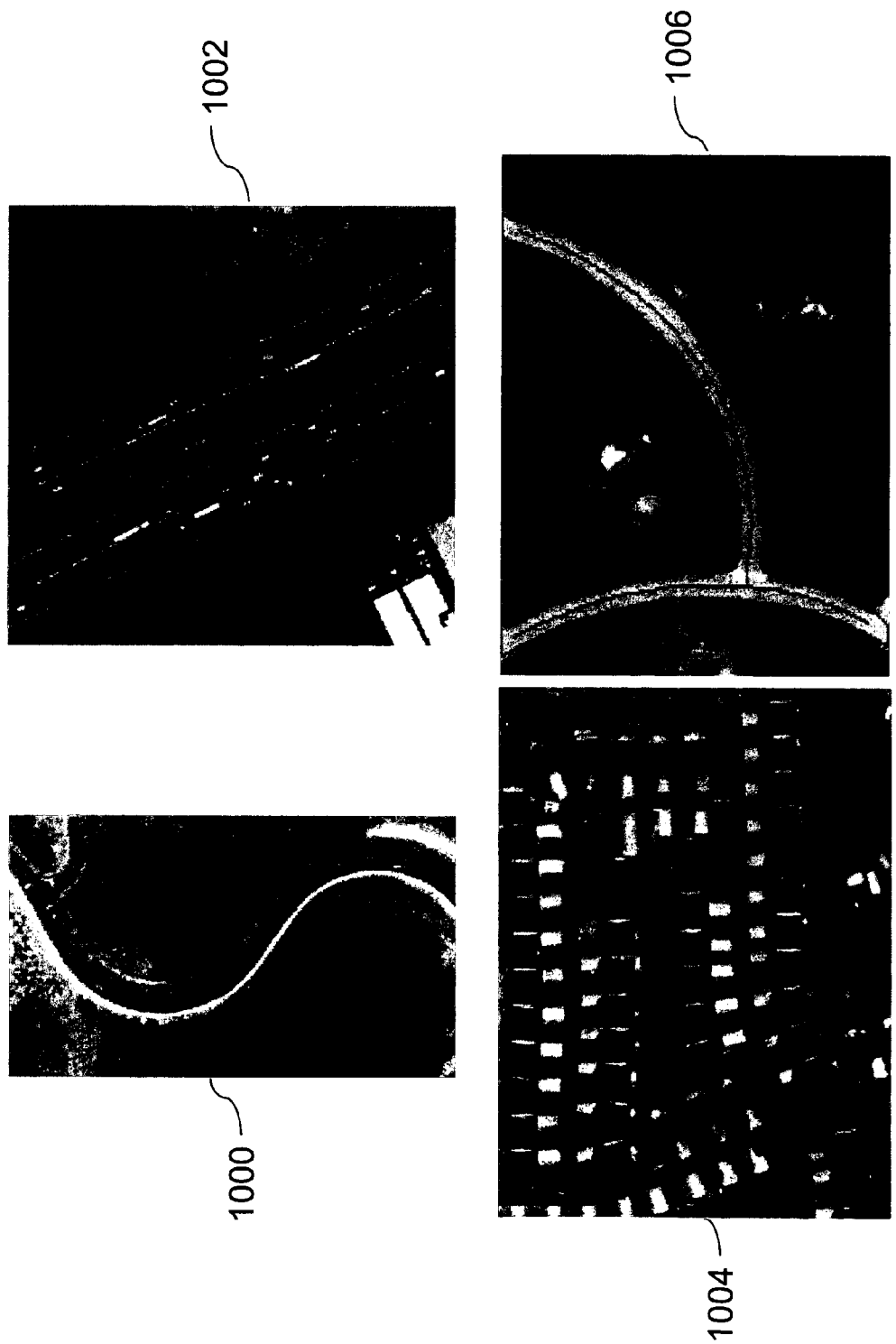
FIG. 10 is a set of several test case images and their corresponding initial seeding points.

All the test cases were executed on a Pentium 4, 1.6 GHz system with 512 MB of RAM. The results obtained by applying the detailed embodiment to the images 900, 902, 904, and 906, are shown in 1000, 1002, 1004, and 1006 in FIG. 10, respectively, with the road boundary and centerline delineated. The road estimates obtained with the present invention were compared with boundaries that were manually hand-annotated or "ground truthed" (GT). For quantitative com parison, the following accuracy and precision measures were computed:

$$\text{Accuracy} = \frac{|GT \cap \text{Estimate}|}{|GT|} \times 100\% \text{ and} \quad (16)$$

a. $\text{Precision} = \frac{|GT \cap \text{Estimate}|}{|\text{Estimate}|} \times 100\%.$ (17)

In both of these equations, |•| represents the size, in pixels, of the given domain. Accuracy will be large when estimate includes all parts of the ground truth and precision will be large when there are no spurious regions included in the estimate that are not in the ground truth. The regularized mean square (RMS) distance of the centerline estimate to the hand-annotated centerline was also computed. The numerical results 1100 presented in Table 1 in FIG. 11 show good performance of the algorithm with respect to both region extraction and centerline estimation.

h. Advantages of the Invention

A system for automatically extracting geospatial features from multi-spectral imagery, suitable for fast and robust extraction of landmarks, was presented. A detailed embodiment of the present invention enables a semi-automated road extraction algorithm based on level set methods. This detailed embodiment allows a user to initialize the algorithm by providing a single seed point, then the level set based region-growing algorithm extracts an entire road network from the single user-provided seed point, regardless of the road's varying topology, crosswalks, underpasses, bridges, foliage, cars, and any other road obstructions.

The previously described embodiments of the present invention have many advantages, including: the ability to extract geospatial features of varying topology; requiring minimum or little human intervention; exploiting the information available from all imagery, multispectral and panchromatic; dealing effectively with cars, crosswalks and other road obstructions; extracting entire road networks from a single seed point; and providing a robust and computationally efficient extraction algorithm. Furthermore, the present invention does not require that all the advantageous features and all the advantages need to be incorporated into every embodiment of the invention.

Although the present invention has been described in considerable detail with reference to certain embodiments thereof, other embodiments are possible. For example, other region-growing algorithms can be used to extract the desired geospatial features; the system can automatically discover a good seed point for a desired geospatial feature without the user selecting the seed point; and further multispectral analysis can be performed to find new multispectral characteristics for the desired geospatial features. Therefore, the spirit and scope of the appended claims should not be limited to the description of the embodiments contained herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

What is claimed is:

1. A method for automatically extracting geospatial features from multi-spectral imagery suitable for fast and robust extraction of landmarks evolved from a single seed point, the method comprising acts of:

receiving an image of an area of land;

receiving a seed point, wherein said seed point represents a part of a desired geospatial feature of the area of land;

iteratively growing a region about the seed point based on a level set technique, with the region representative of the desired geospatial feature, and wherein the growing of the region results in a grown region having edges and a boundary;

appending a selected grown region to a network of grown geospatial features;

automatically reseeding a point on the image, wherein said reseeding point represents a potentially disjointed region of the desired geospatial feature of the area of land;

iteratively performing the acts of growing a region about the seed point, appending, and reseeding, until either exhausting all likely candidates of potentially disjointed regions of the desired geospatial feature, or until reaching the boundaries of the image of an area of land; and outputting the network of grown geospatial features; whereby the outputs include the network of grown geospatial features, and any geometrical or spectral features extracted from the network of grown geospatial features.

2. A method for automatically extracting geospatial features from multi-spectral imagery as set forth in claim 1, wherein in the act of receiving an image of an area of land, there are two types of input imagery consisting of multi-spectral input data, and panchromatic input data.

3. A method for automatically extracting geospatial features from multi-spectral imagery as set forth in claim 2, where the multi-spectral input data and the panchromatic input data are used to create a pan-sharpened image, and wherein the pan-sharpened image preserves the details provided by the panchromatic data, while allowing for the exploitation of color information provided by the four-band color multi-spectral data.

4. A method for automatically extracting geospatial features from multi-spectral imagery as set forth in claim 3, wherein in the act of receiving a seed point, the seed point is provided by a person using the method for automatically extracting geospatial features from multispectral imagery, where said person using the method is called "a user" and said received seed point is labeled "user-provided seed point".

5. A method for automatically extracting geospatial features from multi-spectral imagery as set forth in claim 4, wherein, in the act of iteratively growing a region about the seed point, the region is grown using a level set technique, where the level set technique uses a speed function to control and stop the evolution of a growing region, and wherein the growing region has spectral uniformity and consistent texture.

6. A method for automatically extracting geospatial features from multi-spectral imagery as set forth in claim 5, wherein, in the act of iteratively growing a region about the seed point based on a level set technique, the level set technique speed function is defined in terms of features that include at least one of: spectral uniformity; consistent texture; contrast with surrounding environment; Transformed Vegetative Index mask (TVI mask); and Water Index mask (WI mask).

7. A method for automatically extracting geospatial features from multi-spectral imagery as set forth in claim 6, wherein the TVI mask is a measurement of light reflectance, with specific values for the TVI mask in regions with vegetation, and other specific values for the TVI mask in man made regions, and where the TVI mask is formed by combining near infrared and red color band information.

8. A method for automatically extracting geospatial features from multi-spectral imagery as set forth in claim 7, wherein the WI mask is a measurement of light reflectance, with specific values for the WI mask in water regions, and other specific values for the WI mask in man made regions, and where the WI mask is formed by combining near infrared and green color band information.

9. A method for automatically extracting geospatial features from multi-spectral imagery as set forth in claim 8, further comprising an act of iteratively smoothing the edges of the grown region based on a level set technique in order to eliminate boundary irregularities in a boundary of the grown region, wherein the level set technique uses a speed function to control and stop the evolution of a growing region around the boundary irregularities of the grown region, and wherein the smoothing of the grown region results in a smoothed grown region.

10. A method for automatically extracting geospatial features from multi-spectral imagery as set forth in claim 9, wherein, in the act of iteratively smoothing the edges of the grown region, the speed function for the level set technique is defined in terms of a curvature measurement of the boundary of the grown region, wherein the boundary of the grown region has global properties that define an overall shape of the grown region, and wherein a finite number of iterations are performed in order to smooth out local irregularities in the boundary of the grown region, without changing the global properties of the boundary of the grown region.

11. A method for automatically extracting geospatial features from multi-spectral imagery as set forth in claim 10, further comprising an act of filtering the smoothed grown region with respect to geometrical characteristics of the desired geospatial feature, wherein the filtering of the smoothed grown region results in a filtered grown region, and wherein the filtered grown region has connectivity properties.

12. A method for automatically extracting geospatial features from multi-spectral imagery as set forth in claim 11, wherein the filtered grown region has a center line, and where the method further comprises an act of computing the center line of the filtered grown region, wherein the center line preserves the connectivity properties of the filtered grown region.

13. A method for automatically extracting geospatial features from multi-spectral imagery as set forth in claim 12, wherein, in the act of appending a selected grown region to a network of grown geospatial features, the selected grown region comprises the filtered grown region.

14. A method for automatically extracting geospatial features from multi-spectral imagery as set forth in claim 13, wherein when the filtered grown region reaches a "dead end," the act of reseeding automatically searches an area about the "dead end" to find a new point in the image with similar characteristics to the user-provided seed point, in order to continue the growing of the region representative of the desired geospatial feature.

15. A method for automatically extracting geospatial features from multi-spectral imagery as set forth in claim 14, wherein the centerline of the filtered grown region has an orientation, and wherein the search region about the "dead end" consists of a "cone shaped" search region with an orientation determined by the orientation of the centerline of the filtered grown region, as the centerline approaches the "dead end."

16. A method for automatically extracting geospatial features from multi-spectral imagery as set forth in claim 15, wherein, in the act of reseeding, the characteristics used to compare the reseeding point with the user-provided seed point comprise: textural properties of the image at the reseeding point and textural properties of the image at the user-provided seed point; and distance from the reseeding point to an edge of a region grown out of the reseeding point, and distance from the user-provided seed point to an edge of the filtered grown region.

17. A method for automatically extracting geospatial features from multi-spectral imagery as set forth in claim 16, further comprising an act of computing geometrical features of the network of grown geospatial features, wherein the network of grown geospatial features has branches, and wherein the geometrical features of the network include at least one of: centerlines, areas, lengths, widths, shapes, and roundness values of all the branches in the network.

18. A method for automatically extracting geospatial features from multi-spectral imagery as set forth in claim 17, wherein in the act of filtering the smoothed grown region the desired geospatial features are roads, where the width and length of the smoothed grown regions are used as criteria for accepting or rejecting the smoothed grown regions as real roads or false roads, and wherein the filtered grown regions contain only real roads.

19. A method for automatically extracting geospatial features from multi-spectral imagery as set forth in claim 18, further comprising the act of performing junction analysis, wherein filtered grown regions with centerlines that meet at appropriate angles within road intersections are accepted as real roads, and where filtered grown regions with centerlines that do not meet at appropriate angles within road intersections are considered false roads.

20. A method for automatically extracting geospatial features from multi-spectral imagery as set forth in claim 19, further comprising an act of checking junctions of real roads for shape regularity, wherein intersecting real roads having similar road shape properties are automatically linked.

21. A method for automatically extracting geospatial features from multi-spectral imagery as set forth in claim 20, wherein, in the act of growing a region about the seed point, the speed function for the level set technique, F(x,y), is defined by $$F(x, y) = \left( w e^{-\frac{1}{2}(\tilde{c}(x,y)-\overline{\mu}_0)\sum^{-1}(\tilde{c}(x,y)-\overline{\mu}_0)^T} + (1-w)e^{-|H(x,y)-H_0|} \right) * \frac{1}{1+|\nabla I(x,y)|^p} * e^{-|TVI(x,y)-0.8|} * e^{-|WI(x,y)-0.9|}$$

where:
the first term of the speed function located to the right of the equal sign denotes a spectral uniformity of the grown region;

the second term of the speed function located to the right of the equal sign denotes a consistent texture of the grown region;

the third term of the speed function located to the right of the equal sign denotes contrast of the grown region with a surrounding environment;

the fourth term of the speed function located to the right of the equal sign hinders growth of the grown region into vegetation regions;

the last term of the speed function located to the right of the equal sign hinders growth of the grown region into water regions;

ĉ(x,y) denotes spectral values of the image at (x,y) location;

$\bar{\mu}_0$ represents a vector containing spectral intensities of the image at the user-provided seed point location;

H(x,y) denotes an entropy value of the image at point (x,y);

$H_0$ is an entropy value of the image at the user-provided seed point location;

parameter w determines relative weightings between the spectral uniformity and the entropy terms representing the texture of the grown region;

∇I term denotes an image gradient which extracts strong edges between the boundary of the grown region and other regions;

Σ denotes a diagonal covariance matrix which is a function of noise present in the image, where Σ allows for tuning the sensitivity of the spectral uniformity term; and parameter p is a function of contrast present in the image, where p allows for tuning the sensitivity of the contrast term.

22. A method for automatically extracting geospatial features from multi-spectral imagery as set forth in claim 21, wherein, in the act of iteratively smoothing the edges of the grown region, the grown region has a curvature value associated with its boundary, and wherein the curvature of the boundary of the grown region, κ, and the speed function, F(x,y), are defined by $$\kappa = \frac{\Phi_{xx}\Phi_y^2 - 2\Phi_x\Phi_y\Phi_{xy} + \Phi_{yy}\Phi_x^2}{(\Phi_x^2 + \Phi_y^2)^{\frac{3}{2}}}$$

$$F(x,y) = -\min(\kappa(x,y), 0)$$

where

Φ denotes a level set function defined by Φ(x,y)=±d(x,y), where d(x,y) denotes smallest distance from a point (x,y) within the image to the boundary of the grown region, and the +/− signs are chosen such that points inside the boundary have a negative distance sign, and such that points outside the boundary have a positive distance sign;

$\Phi_x$ denotes the partial derivative of Φ with respect to x coordinate;

$\Phi_y$ denotes the partial derivative of Φ with respect to y coordinate;

$\Phi_{xy}$ denotes the partial derivatives of Φ with respect to x and y coordinates;

$\Phi_{xx}$ denotes the partial derivatives of Φ with respect to x and x coordinates; and $\Phi_{yy}$ denotes the partial derivatives of Φ with respect to y and y coordinates.

23. A method for automatically extracting geospatial features from multi-spectral imagery as set forth in claim 22, wherein, in the act of automatically reseeding a point on the image, the reseeding point is determined as a maximum likelihood point that lies within the "cone shaped" search region about the "dead end" that most closely satisfy $$SeedLH(x,y) = \mathrm{Exp}\left\{-\left|\frac{\left(\frac{\sigma(x,y)+\sigma_0}{2} + \left(\frac{H(x,y)-H_0}{2}\right)^2\right)^2}{\sigma(x,y)*\sigma_0} - 1\right|\right\} * \mathrm{Exp}\{-|edt(x,y)-d_0|\}$$

where

SeedLH(x,y) denotes likelihood of a point (x,y) of being an appropriate reseeding point representing a part of the desired geospatial feature of the area of land;

σ(x,y) denotes variance associated with the image at point (x,y);

$\sigma_0$ denotes variance associated with the user-provided seed point;

H(x,y) denotes an entropy value of the image at point (x,y);

$H_0$ is an entropy value of the image at the user-provided seed point location;

edt(x,y) (Euclidean Distance Transform) denotes a Euclidean distance between a pixel point (x,y) and a nearest edge of a region grown out of the pixel point (x,y); and $d_0$ denotes estimated width of the previously filtered grown region which terminated on the "dead end" generating the current "cone shaped" search region.

24. A method for automatically extracting geospatial features from multi-spectral imagery as set forth in claim 1, wherein in the act of receiving an image of an area of land, there are two types of input imagery consisting of multi-spectral input data, and panchromatic input data, and where the multi-spectral input data and the panchromatic input data are used to create a pan-sharpened image, wherein the pan-sharpened image preserves the details provided by the panchromatic data, while allowing for the exploitation of color information provided by the four-band color multi-spectral data.

25. A method for automatically extracting geospatial features from multi-spectral imagery as set forth in claim 1, wherein in the act of receiving a seed point, the seed point is provided by either:

a person using the method for automatically extracting geospatial features from multispectral imagery, where said person using the method is called "a user" and said received seed point is labeled "user-provided seed point"; or an act generating automatically a likely seed point representing a part of the desired geospatial feature of the area of land.

26. A method for automatically extracting geospatial features from multi-spectral imagery as set forth in claim 1, wherein, in the act of iteratively growing a region about a seed point, the region is grown using a level set technique, where the level set technique uses a speed function to control and stop the evolution of a growing region, and wherein the speed function is defined in terms of features that include at least one of: spectral uniformity; consistent texture; contrast with surrounding environment; Transformed Vegetative Index mask (TVI mask); and Water Index mask (WI mask).

27. A method for automatically extracting geospatial features from multi-spectral imagery as set forth in claim 1, wherein, in the act of iteratively growing a region about a seed point, the region is grown using a level set technique using a Transformed Vegetative Index mask (TVI mask) and Water Index mask (WI mask), where the TVI mask is formed by combining near infrared and red color band information, with specific values for the TVI mask in regions with vegetation, and other specific values for the TVI mask in man made regions, and where the WI mask is formed by combining near infrared and green color band information, with specific values for the WI mask in water regions, and other specific values for the WI mask in man made regions.

28. A method for automatically extracting geospatial features from multi-spectral imagery as set forth in claim 1, further comprising an act of iteratively smoothing the edges of the grown region in order to eliminate boundary irregularities in a boundary of the grown region, wherein the act of smoothing is based on a level set technique using a speed function to control and stop the evolution of a growing region around the boundary irregularities of the grown region, and wherein the smoothing of the grown region results in a smoothed grown region.

29. A method for automatically extracting geospatial features from multi-spectral imagery as set forth in claim 28, wherein, in the act of iteratively smoothing the edges of the grown region, the speed function for the level set technique is defined in terms of a curvature measurement of the boundary of the grown region, wherein the boundary of the grown region has global properties that define an overall shape of the grown region, and wherein a finite number of iterations are performed in order to smooth out local irregularities in the boundary of the grown region, without changing the global properties of the boundary of the grown region.

30. A method for automatically extracting geospatial features from multi-spectral imagery as set forth in claim 29, wherein, in the act of iteratively smoothing the edges of the grown region, the grown region has a curvature value associated with its boundary, and wherein the curvature of the boundary of the grown region, $\kappa$, and the speed function, $F(x,y)$, are defined by $$\kappa = \frac{\Phi_{xx}\Phi_y^2 - 2\Phi_x\Phi_y\Phi_{xy} + \Phi_{yy}\Phi_x^2}{(\Phi_x^2 + \Phi_y^2)^{\frac{3}{2}}}$$

$$F(x,y) = -\min(\kappa(x,y), 0)$$

where
- $\Phi$ denotes a level set function defined by $\Phi(x,y) = \pm d(x,y)$, where $d(x,y)$ denotes smallest distance from a point $(x,y)$ within the image to the boundary of the grown region, and the +/− signs are chosen such that points inside the boundary have a negative distance sign, and such that points outside the boundary have a positive distance sign;
- $\Phi_x$ denotes the partial derivative of $\Phi$ with respect to x coordinate;
- $\Phi_y$ denotes the partial derivative of $\Phi$ with respect to y coordinate;
- $\Phi_{xy}$ denotes the partial derivatives of $\Phi$ with respect to x and y coordinates;
- $\Phi_{xx}$ denotes the partial derivatives of $\Phi$ with respect to x and x coordinates; and
- $\Phi_{yy}$ denotes the partial derivatives of $\Phi$ with respect to y and y coordinates.

31. A method for automatically extracting geospatial features from multi-spectral imagery as set forth in claim 1, further comprising an act of filtering the grown region with respect to geometrical characteristics of the desired geospatial feature, wherein the filtering of the grown region results in a filtered grown region, and wherein the filtered grown region has connectivity properties and a center line, where the center line preserves the connectivity properties of the filtered grown region.

32. A method for automatically extracting geospatial features from multi-spectral imagery as set forth in claim 31, wherein, in the act of appending a selected grown region to a network of grown geospatial features, the selected grown region comprises the filtered grown region.

33. A method for automatically extracting geospatial features from multi-spectral imagery as set forth in claim 31, wherein in the act of filtering the grown region the desired geospatial features are roads, where the width and length of the grown regions are used as criteria for accepting or rejecting the grown regions as real roads or false roads, and wherein the filtered grown regions contain only real roads.

34. A method for automatically extracting geospatial features from multi-spectral imagery as set forth in claim 33, further comprising the acts of:
- performing junction analysis, wherein filtered grown regions with centerlines that meet at appropriate angles within road intersections are accepted as real roads, and where filtered grown regions with centerlines that do not meet at appropriate angles within road intersections are considered false roads; and
- checking junctions of real roads for shape regularity, wherein intersecting real roads having similar road shape properties are automatically linked and appended to a network of grown roads.

35. A method for automatically extracting geospatial features from multi-spectral imagery as set forth in claim 1, wherein, in the act of automatically reseeding a point on the image, the selected grown region has a center line, with the center line having an orientation, and where the method further comprises the acts of:
- computing the center line of the selected grown region; and
- when the selected grown region reaches a "dead end," searching an area about the "dead end" to find a new point in the image with similar characteristics to the initial seed point, in order to continue the growing of the region representative of the desired geospatial feature, and wherein the search region about the "dead end" consists of a "cone shaped" search region with an orientation determined by the orientation of the centerline of the selected grown region, as the centerline approaches the "dead end."

36. A method for automatically extracting geospatial features from multi-spectral imagery as set forth in claim 1, wherein, in the act of reseeding, the characteristics used to compare the reseeding point with the initial seed point comprise: textural properties of the image at the reseeding point and textural properties of the image at the initial seed point; and distance from the reseeding point to an edge of a region grown out of the reseeding point, and distance from the initial seed point to an edge of the grown region.

37. A method for automatically extracting geospatial features from multi-spectral imagery as set forth in claim 1, further comprising an act of computing geometrical features of the network of grown geospatial features, wherein the network of grown geospatial features has branches, and wherein the geometrical features of the network include at least one of: centerlines, areas, lengths, widths, shapes, and roundness values of all the branches in the network.

38. A method for automatically extracting geospatial features from multi-spectral imagery as set forth in claim 1, wherein, in the act of growing a region about the seed point, the region is grown using a level set technique that utilizes a speed function F(x,y) defined by $$F(x, y) = \left(we^{-\frac{1}{2}(\hat{c}(x,y)-\overline{\mu}_0)\Sigma^{-1}(\hat{c}(x,y)-\overline{\mu}_0)^T} + (1-w)e^{-|H(x,y)-H_0|}\right) *$$

$$\frac{1}{1+|\nabla I(x,y)|^p} * e^{-|TVI(x,y)-0.8|} * e^{-|WI(x,y)-0.9|}$$

where:
- the first term of the speed function located to the right of the equal sign denotes a spectral uniformity of the grown region;
- the second term of the speed function located to the right of the equal sign denotes a consistent texture of the grown region;
- the third term of the speed function located to the right of the equal sign denotes contrast of the grown region with a surrounding environment;
- the fourth term of the speed function located to the right of the equal sign hinders growth of the grown region into vegetation regions;
- the last term of the speed function located to the right of the equal sign hinders growth of the grown region into water regions;
- $\hat{c}(x,y)$ denotes spectral values of the image at (x,y) location;
- $\overline{\mu}_0$ represents a vector containing spectral intensities of the image at the user-provided seed point location;
- $H(x,y)$ denotes an entropy value of the image at point (x,y);
- $H_0$ is an entropy value of the image at the user-provided seed point location;
- parameter w determines relative weightings between the spectral uniformity and the entropy terms representing the texture of the grown region;
- $\nabla I$ term denotes an image gradient which extracts strong edges between the boundary of the grown region and other regions;
- $\Sigma$ denotes a diagonal covariance matrix which is a function of noise present in the image, where $\Sigma$ allows for tuning the sensitivity of the spectral uniformity term; and
- parameter p is a function of contrast present in the image, where p allows for tuning the sensitivity of the contrast term.

39. A method for automatically extracting geospatial features from multi-spectral imagery as set forth in claim 1, wherein, in the act of automatically reseeding a point on the image, when a selected grown region reaches a "dead end," the reseeding point is determined as a maximum likelihood point that lies within a "cone shaped" search region about the "dead end" that most closely satisfy $$SeedLH(x, y) = \mathrm{Exp}\left\{-\left|\frac{\left(\frac{\sigma(x,y)+\sigma_0}{2}+\left(\frac{H(x,y)-H_0}{2}\right)^2\right)^2}{\sigma(x,y)*\sigma_0}-1\right|\right\} *$$

$$\mathrm{Exp}\{-|edt(x,y)-d_0|\}$$

where
- SeedLH(x,y) denotes likelihood of a point (x,y) of being an appropriate reseeding point representing a part of the desired geospatial feature of the area of land;
- $\sigma(x,y)$ denotes variance associated with the image at point (x,y);
- $\sigma_0$ denotes variance associated with the initial seed point;
- H(x,y) denotes an entropy value of the image at point (x,y);
- $H_0$ is an entropy value of the image at the initial seed point location;
- edt(x,y) (Euclidean Distance Transform) denotes a Euclidean distance between a pixel point (x,y) and a nearest edge of a region grown out of the pixel point (x,y); and
- $d_0$ denotes estimated width of the previously selected grown region which terminated on the "dead end" generating the current "cone shaped" search region.

40. A method for automatically extracting geospatial features from multi-spectral imagery suitable for fast and robust extraction of landmarks evolved from a single seed point, the method comprising acts of:
- receiving an image of an area of land;
- generating automatically likely seed points representing a part of a desired geospatial feature of the area of land;
- iteratively growing a region about the seed point based on a level set technique, with the region representative of the desired geospatial feature, and wherein the growing of the region results in a grown region having edges and a boundary;
- appending a selected grown region to a network of grown geospatial features;
- automatically reseeding a point on the image, wherein said reseeding point represents a potentially disjointed region of the desired geospatial feature of the area of land;
- iteratively performing the acts of growing a region about the seed point, appending, and reseeding, until either exhausting all likely candidates of potentially disjointed regions of the desired geospatial feature, or until reaching the boundaries of the image of an area of land; and
- outputting the grown network representative of the desired geospatial feature; whereby the outputs include the network of the grown geospatial feature, and any geometrical or spectral features extracted from the network of the grown geospatial feature.

41. A system for automatically extracting geospatial features from multi-spectral imagery suitable for fast and robust extraction of landmarks evolved from a single seed point, the system comprising:
- a computer system including a processor, a memory coupled with the processor, an input coupled with the processor for receiving an image of an area of land and a seed point representing a part of a desired geospatial feature of the area of land, the computer system further comprising means, residing in its processor and memory for:
  - iteratively growing a region about the seed point based on a level set technique, with the region representative of the desired geospatial feature, and wherein the growing of the region results in a grown region having edges and a boundary;
  - appending a selected grown region to a network of grown geospatial features;
  - automatically reseeding a point on the image, wherein said reseeding point represents a potentially disjointed region of the desired geospatial feature of the area of land;
  - iteratively performing the means for growing a region about the seed point, the means for appending, and the means for reseeding, until either exhausting all likely candidates of potentially disjointed regions of the desired geospatial feature, or until reaching the boundaries of the image of an area of land; and outputting the network of grown geospatial features; whereby the outputs include the network of grown geospatial features, and any geometrical or spectral features extracted from the network of grown geospatial features.

42. A system for automatically extracting geospatial features from multi-spectral imagery as set forth in claim 41, wherein in the means for receiving an image of an area of land, there are two types of input imagery consisting of multi-spectral input data, and panchromatic input data.

43. A system for automatically extracting geospatial features from multi-spectral imagery as set forth in claim 42, where the multi-spectral input data and the panchromatic input data are used to create a pan-sharpened image, and wherein the pan-sharpened image preserves the details provided by the panchromatic data, while allowing for the exploitation of color information provided by the four-band color multi-spectral data.

44. A system for automatically extracting geospatial features from multi-spectral imagery as set forth in claim 43, wherein in the means for receiving a seed point, the seed point is provided by a person using the system for automatically extracting geospatial features from multispectral imagery, where said person using the system is called "a user" and said received seed point is labeled "user-provided seed point".

45. A system for automatically extracting geospatial features from multi-spectral imagery as set forth in claim 44, wherein, in the means for iteratively growing a region about the seed point, the region is grown using a level set technique, where the level set technique uses a speed function to control and stop the evolution of a growing region, and wherein the growing region has spectral uniformity and consistent texture.

46. A system for automatically extracting geospatial features from multi-spectral imagery as set forth in claim 45, wherein, in the means for iteratively growing a region about the seed point based on a level set technique, the level set technique speed function is defined in terms of features that include at least one of: spectral uniformity; consistent texture; contrast with surrounding environment; Transformed Vegetative Index mask (TVI mask); and Water Index mask (WI mask).

47. A system for automatically extracting geospatial features from multi-spectral imagery as set forth in claim 46, wherein the TVI mask is a measurement of light reflectance, with specific values for the TVI mask in regions with vegetation, and other specific values for the TVI mask in man made regions, and where the TVI mask is formed by combining near infrared and red color band information.

48. A system for automatically extracting geospatial features from multi-spectral imagery as set forth in claim 47, wherein the WI mask is a measurement of light reflectance, with specific values for the WI mask in water regions, and other specific values for the WI mask in man made regions, and where the WI mask is formed by combining near infrared and green color band information.

49. A system for automatically extracting geospatial features from multi-spectral imagery as set forth in claim 48, further comprising a means for iteratively smoothing the edges of the grown region based on a level set technique in order to eliminate boundary irregularities in a boundary of the grown region, wherein the level set technique uses a speed function to control and stop the evolution of a growing region around the boundary irregularities of the grown region, and wherein the smoothing of the grown region results in a smoothed grown region.

50. A system for automatically extracting geospatial features from multi-spectral imagery as set forth in claim 49, wherein, in the means for iteratively smoothing the edges of the grown region, the speed function for the level set technique is defined in terms of a curvature measurement of the boundary of the grown region, wherein the boundary of the grown region has global properties that define an overall shape of the grown region, and wherein a finite number of iterations are performed in order to smooth out local irregularities in the boundary of the grown region, without changing the global properties of the boundary of the grown region.

51. A system for automatically extracting geospatial features from multi-spectral imagery as set forth in claim 50, further comprising a means for filtering the smoothed grown region with respect to geometrical characteristics of the desired geospatial feature, wherein the filtering of the smoothed grown region results in a filtered grown region, and wherein the filtered grown region has connectivity properties.

52. A system for automatically extracting geospatial features from multi-spectral imagery as set forth in claim 51, wherein the filtered grown region has a center line, and where the system further comprises a means for computing the center line of the filtered grown region, wherein the center line preserves the connectivity properties of the filtered grown region.

53. A system for automatically extracting geospatial features from multi-spectral imagery as set forth in claim 52, wherein, in the means for appending a selected grown region to a network of grown geospatial features, the selected grown region comprises the filtered grown region.

54. A system for automatically extracting geospatial features from multi-spectral imagery as set forth in claim 53, wherein when the filtered grown region reaches a "dead end," the means for reseeding automatically searches an area about the "dead end" to find a new point in the image with similar characteristics to the user-provided seed point, in order to continue the growing of the region representative of the desired geospatial feature.

55. A system for automatically extracting geospatial features from multi-spectral imagery as set forth in claim 54, wherein the centerline of the filtered grown region has an orientation, and wherein the search region about the "dead end" consists of a "cone shaped" search region with an orientation determined by the orientation of the centerline of the filtered grown region, as the centerline approaches the "dead end."

56. A system for automatically extracting geospatial features from multi-spectral imagery as set forth in claim 55, wherein, in the means for reseeding, the characteristics used to compare the reseeding point with the user-provided seed point comprise: textural properties of the image at the reseeding point and textural properties of the image at the user-provided seed point; and distance from the reseeding point to an edge of a region grown out of the reseeding point, and distance from the user-provided seed point to an edge of the filtered grown region.

57. A system for automatically extracting geospatial features from multi-spectral imagery as set forth in claim 56, further comprising a means for computing geometrical features of the network of grown geospatial features, wherein the network of grown geospatial features has branches, and wherein the geometrical features of the network include at least one of: centerlines, areas, lengths, widths, shapes, and roundness values of all the branches in the network.

58. A system for automatically extracting geospatial features from multi-spectral imagery as set forth in claim 57, wherein in the means for filtering the smoothed grown region the desired geospatial features are roads, where the width and length of the smoothed grown regions are used as criteria for accepting or rejecting the smoothed grown regions as real roads or false roads, and wherein the filtered grown regions contain only real roads.

59. A system for automatically extracting geospatial features from multi-spectral imagery as set forth in claim 58, further comprising the means for performing junction analysis, wherein filtered grown regions with centerlines that meet at appropriate angles within road intersections are accepted as real roads, and where filtered grown regions with centerlines that do not meet at appropriate angles within road intersections are considered false roads.

60. A system for automatically extracting geospatial features from multi-spectral imagery as set forth in claim 59, further comprising a means for checking junctions of real roads for shape regularity, wherein intersecting real roads having similar road shape properties are automatically linked.

61. A system for automatically extracting geospatial features from multi-spectral imagery as set forth in claim 60, wherein, in the means for growing a region about the seed point, the speed function for the level set technique, F(x,y), is defined by $$F(x, y) = \left( w e^{-\frac{1}{2}(\hat{c}(x,y)-\overline{\mu}_0)\Sigma^{-1}(\hat{c}(x,y)-\overline{\mu}_0)^T} + (1-w)e^{-|H(x,y)-H_0|} \right) * \frac{1}{1+|\nabla I(x, y)|^p} * e^{-|TVI(x,y)-0.8|} * e^{-|WI(x,y)-0.9|}$$

where:
the first term of the speed function located to the right of the equal sign denotes a spectral uniformity of the grown region;
the second term of the speed function located to the right of the equal sign denotes a consistent texture of the grown region;
the third term of the speed function located to the right of the equal sign denotes contrast of the grown region with a surrounding environment;
the fourth term of the speed function located to the right of the equal sign hinders growth of the grown region into vegetation regions;
the last term of the speed function located to the right of the equal sign hinders growth of the grown region into water regions;
$\hat{c}(x,y)$ denotes spectral values of the image at (x,y) location;
$\overline{\mu}_0$ represents a vector containing spectral intensities of the image at the user-provided seed point location;
H(x,y) denotes an entropy value of the image at point (x,y);
$H_0$ is an entropy value of the image at the user-provided seed point location;
parameter w determines relative weightings between the spectral uniformity and the entropy terms representing the texture of the grown region;
$\nabla I$ term denotes an image gradient which extracts strong edges between the boundary of the grown region and other regions;
$\Sigma$ denotes a diagonal covariance matrix which is a function of noise present in the image, where $\Sigma$ allows for tuning the sensitivity of the spectral uniformity term; and
parameter p is a function of contrast present in the image, where p allows for tuning the sensitivity of the contrast term.

62. A system for automatically extracting geospatial features from multi-spectral imagery as set forth in claim 61, wherein, in the means for iteratively smoothing the edges of the grown region, the grown region has a curvature value associated with its boundary, and wherein the curvature of the boundary of the grown region, κ, and the speed function, F(x,y), are defined by $$\kappa = \frac{\Phi_{xx}\Phi_y^2 - 2\Phi_x\Phi_y\Phi_{xy} + \Phi_{yy}\Phi_x^2}{(\Phi_x^2 + \Phi_y^2)^{3/2}}$$

$$F(x,y) = -\min(\kappa(x,y), 0)$$

where
Φ denotes a level set function defined by $\Phi(x,y)=\pm d(x,y)$, where d(x,y) denotes smallest distance from a point (x,y) within the image to the boundary of the grown region, and the +/− signs are chosen such that points inside the boundary have a negative distance sign, and such that points outside the boundary have a positive distance sign;
$\Phi_x$ denotes the partial derivative of Φ with respect to x coordinate;
$\Phi_y$ denotes the partial derivative of Φ with respect to y coordinate;
$\Phi_{xy}$ denotes the partial derivatives of Φ with respect to x and y coordinates;
$\Phi_{xx}$ denotes the partial derivatives of Φ with respect to x and x coordinates; and
$\Phi_{yy}$ denotes the partial derivatives of Φ with respect to y and y coordinates.

63. A system for automatically extracting geospatial features from multi-spectral imagery as set forth in claim 62, wherein, in the means for automatically reseeding a point on the image, the reseeding point is determined as a maximum likelihood point that lies within the "cone shaped" search region about the "dead end" that most closely satisfy $$SeedLH(x, y) = \text{Exp}\left\{-\left|\frac{\left(\frac{\sigma(x, y)+\sigma_0}{2} + \left(\frac{H(x, y)-H_0}{2}\right)^2\right)^2}{\sigma(x, y)*\sigma_0} - 1\right|\right\} * \text{Exp}\{-|edt(x, y) - d_0|\}$$

where
SeedLH(x,y) denotes likelihood of a point (x,y) of being an appropriate reseeding point representing a part of the desired geospatial feature of the area of land;
σ (x,y) denotes variance associated with the image at point (x,y);
$\sigma_0$ denotes variance associated with the user-provided seed point;
H(x,y) denotes an entropy value of the image at point (x,y);
$H_0$ is an entropy value of the image at the user-provided seed point location;
edt(x,y) (Euclidean Distance Transform) denotes a Euclidean distance between a pixel point (x,y) and a nearest edge of a region grown out of the pixel point (x,y); and
$d_0$ denotes estimated width of the previously filtered grown region which terminated on the "dead end" generating the current "cone shaped" search region.

64. A system for automatically extracting geospatial features from multi-spectral imagery as set forth in claim 41, wherein in the means for receiving an image of an area of land, there are two types of input imagery consisting of multi-spectral input data, and panchromatic input data, and where the multi-spectral input data and the panchromatic input data are used to create a pan-sharpened image, wherein the pan-sharpened image preserves the details provided by the panchromatic data, while allowing for the exploitation of color information provided by the four-band color multi-spectral data.

65. A system for automatically extracting geospatial features from multi-spectral imagery as set forth in claim 41, wherein in the means for receiving a seed point, the seed point is provided by either:
 a person using the system for automatically extracting geospatial features from multispectral imagery, where said person using the system is called "a user" and said received seed point is labeled "user-provided seed point"; or
 a means for generating automatically a likely seed point representing a part of the desired geospatial feature of the area of land.

66. A system for automatically extracting geospatial features from multi-spectral imagery as set forth in claim 41, wherein, in the means for iteratively growing a region about a seed point, the region is grown using a level set technique, where the level set technique uses a speed function to control and stop the evolution of a growing region, and wherein the speed function is defined in terms of features that include at least one of: spectral uniformity; consistent texture; contrast with surrounding environment; Transformed Vegetative Index mask (TVI mask); and Water Index mask (WI mask).

67. A system for automatically extracting geospatial features from multi-spectral imagery as set forth in claim 41, wherein, in the means for iteratively growing a region about a seed point, the region is grown using a level set technique using a Transformed Vegetative Index mask (TVI mask) and Water Index mask (WI mask), where the TVI mask is formed by combining near infrared and red color band information, with specific values for the TVI mask in regions with vegetation, and other specific values for the TVI mask in man made regions, and where the WI mask is formed by combining near infrared and green color band information, with specific values for the WI mask in water regions, and other specific values for the WI mask in man made regions.

68. A system for automatically extracting geospatial features from multi-spectral imagery as set forth in claim 41, further comprising a means for iteratively smoothing the edges of the grown region in order to eliminate boundary irregularities in a boundary of the grown region, wherein the means for smoothing is based on a level set technique using a speed function to control and stop the evolution of a growing region around the boundary irregularities of the grown region, and wherein the smoothing of the grown region results in a smoothed grown region.

69. A system for automatically extracting geospatial features from multi-spectral imagery as set forth in claim 68, wherein, in the means for iteratively smoothing the edges of the grown region, the speed function for the level set technique is defined in terms of a curvature measurement of the boundary of the grown region, wherein the boundary of the grown region has global properties that define an overall shape of the grown region, and wherein a finite number of iterations are performed in order to smooth out local irregularities in the boundary of the grown region, without changing the global properties of the boundary of the grown region.

70. A system for automatically extracting geospatial features from multi-spectral imagery as set forth in claim 69, wherein, in the means for iteratively smoothing the edges of the grown region, the grown region has a curvature value associated with its boundary, and wherein the curvature of the boundary of the grown region, $\kappa$, and the speed function, $F(x,y)$, are defined by $$\kappa = \frac{\Phi_{xx}\Phi_y^2 - 2\Phi_x\Phi_y\Phi_{xy} + \Phi_{yy}\Phi_x^2}{(\Phi_x^2 + \Phi_y^2)^{3/2}}$$

$$F(x,y)=-\min(\kappa(x,y),0)$$

where
 $\Phi$ denotes a level set function defined by $\Phi(x,y)=\pm d(x,y)$, where $d(x,y)$ denotes smallest distance from a point $(x,y)$ within the image to the boundary of the grown region, and the +/− signs are chosen such that points inside the boundary have a negative distance sign, and such that points outside the boundary have a positive distance sign;
 $\Phi_x$ denotes the partial derivative of $\Phi$ with respect to x coordinate;
 $\Phi_y$ denotes the partial derivative of $\Phi$ with respect to y coordinate;
 $\Phi_{xy}$ denotes the partial derivatives of $\Phi$ with respect to x and y coordinates;
 $\Phi_{xx}$ denotes the partial derivatives of $\Phi$ with respect to x and x coordinates; and
 $\Phi_{yy}$ denotes the partial derivatives of $\Phi$ with respect to y and y coordinates.

71. A system for automatically extracting geospatial features from multi-spectral imagery as set forth in claim 41, further comprising a means for filtering the grown region with respect to geometrical characteristics of the desired geospatial feature, wherein the filtering of the grown region results in a filtered grown region, and wherein the filtered grown region has connectivity properties and a center line, where the center line preserves the connectivity properties of the filtered grown region.

72. A system for automatically extracting geospatial features from multi-spectral imagery as set forth in claim 71, wherein, in the means for appending a selected grown region to a network of grown geospatial features, the selected grown region comprises the filtered grown region.

73. A system for automatically extracting geospatial features from multi-spectral imagery as set forth in claim 71, wherein in the means for filtering the grown region the desired geospatial features are roads, where the width and length of the grown regions are used as criteria for accepting or rejecting the grown regions as real roads or false roads, and wherein the filtered grown regions contain only real roads.

74. A system for automatically extracting geospatial features from multi-spectral imagery as set forth in claim 73, further comprising the means for:
 performing junction analysis, wherein filtered grown regions with centerlines that meet at appropriate angles within road intersections are accepted as real roads, and where filtered grown regions with centerlines that do not meet at appropriate angles within road intersections are considered false roads; and
 checking junctions of real roads for shape regularity, wherein intersecting real roads having similar road shape properties are automatically linked and appended to a network of grown roads.

75. A system for automatically extracting geospatial features from multi-spectral imagery as set forth in claim 41, wherein, in the means for automatically reseeding a point on the image, the selected grown region has a center line, with the center line having an orientation, and where the system further comprises the means for:
- computing the center line of the selected grown region; and
- when the selected grown region reaches a "dead end," searching an area about the "dead end" to find a new point in the image with similar characteristics to the initial seed point, in order to continue the growing of the region representative of the desired geospatial feature, and wherein the search region about the "dead end" consists of a "cone shaped" search region with an orientation determined by the orientation of the centerline of the selected grown region, as the centerline approaches the "dead end."

76. A system for automatically extracting geospatial features from multi-spectral imagery as set forth in claim 41, wherein, in the means for reseeding, the characteristics used to compare the reseeding point with the initial seed point comprise: textural properties of the image at the reseeding point and textural properties of the image at the initial seed point; and distance from the reseeding point to an edge of a region grown out of the reseeding point, and distance from the initial seed point to an edge of the grown region.

77. A system for automatically extracting geospatial features from multi-spectral imagery as set forth in claim 41, further comprising a means for computing geometrical features of the network of grown geospatial features, wherein the network of grown geospatial features has branches, and wherein the geometrical features of the network include at least one of: centerlines, areas, lengths, widths, shapes, and roundness values of all the branches in the network.

78. A system for automatically extracting geospatial features from multi-spectral imagery as set forth in claim 41, wherein, in the means for growing a region about the seed point, the region is grown using a level set technique that utilizes a speed function $F(x,y)$ defined by $$F(x, y) = \left( w e^{-\frac{1}{2}(\hat{c}(x,y)-\overline{\mu}_0)\Sigma^{-1}(\hat{c}(x,y)-\overline{\mu}_0)^T} + (1-w)e^{-|H(x,y)-H_0|} \right) *$$
$$\frac{1}{1+|\nabla I(x,y)|^p} * e^{-|TVI(x,y)-0.8|} * e^{-|WI(x,y)-0.9|}$$

where:
- the first term of the speed function located to the right of the equal sign denotes a spectral uniformity of the grown region;
- the second term of the speed function located to the right of the equal sign denotes a consistent texture of the grown region;
- the third term of the speed function located to the right of the equal sign denotes contrast of the grown region with a surrounding environment;
- the fourth term of the speed function located to the right of the equal sign hinders growth of the grown region into vegetation regions;
- the last term of the speed function located to the right of the equal sign hinders growth of the grown region into water regions;
- $\hat{c}(x,y)$ denotes spectral values of the image at $(x,y)$ location;
- $\overline{\mu}_0$ represents a vector containing spectral intensities of the image at the user-provided seed point location;
- $H(x,y)$ denotes an entropy value of the image at point $(x,y)$;
- $H_0$ is an entropy value of the image at the user-provided seed point location;
- parameter w determines relative weightings between the spectral uniformity and the entropy terms representing the texture of the grown region;
- $\nabla I$ term denotes an image gradient which extracts strong edges between the boundary of the grown region and other regions;
- $\Sigma$ denotes a diagonal covariance matrix which is a function of noise present in the image, where $\Sigma$ allows for tuning the sensitivity of the spectral uniformity term; and
- parameter p is a function of contrast present in the image, where p allows for tuning the sensitivity of the contrast term.

79. A system for automatically extracting geospatial features from multi-spectral imagery as set forth in claim 41, wherein, in the means for automatically reseeding a point on the image, when a selected grown region reaches a "dead end," the reseeding point is determined as a maximum likelihood point that lies within a "cone shaped" search region about the "dead end" that most closely satisfy $$SeedLH(x, y) = \text{Exp}\left\{-\left|\frac{\left(\frac{\sigma(x,y)+\sigma_0}{2}+\left(\frac{H(x,y)-H_0}{2}\right)^2\right)^2}{\sigma(x,y)*\sigma_0}-1\right|\right\}*$$
$$\text{Exp}\{-|edt(x,y)-d_0|\}$$

where
- $SeedLH(x,y)$ denotes likelihood of a point $(x,y)$ of being an appropriate reseeding point representing a part of the desired geospatial feature of the area of land;
- $\sigma(x,y)$ denotes variance associated with the image at point $(x,y)$;
- $\sigma_0$ denotes variance associated with the initial seed point;
- $H(x,y)$ denotes an entropy value of the image at point $(x,y)$;
- $H_0$ is an entropy value of the image at the initial seed point location;
- $edt(x,y)$ (Euclidean Distance Transform) denotes a Euclidean distance between a pixel point $(x,y)$ and a nearest edge of a region grown out of the pixel point $(x,y)$; and
- $d_0$ denotes estimated width of the previously selected grown region which terminated on the "dead end" generating the current "cone shaped" search region.

80. A system for automatically extracting geospatial features from multi-spectral imagery suitable for fast and robust extraction of landmarks evolved from a single seed point, the system comprising means for:
- receiving an image of an area of land;
- generating automatically likely seed points representing a part of a desired geospatial feature of the area of land;
- iteratively growing a region about the seed point based on a level set technique, with the region representative of the desired geospatial feature, and wherein the growing of the region results in a grown region having edges and a boundary;
- appending a selected grown region to a network of grown geospatial features;
- automatically reseeding a point on the image, wherein said reseeding point represents a potentially disjointed region of the desired geospatial feature of the area of land;
- iteratively performing the means for growing a region about the seed point, appending, and reseeding, until either exhausting all likely candidates of potentially disjointed regions of the desired geospatial feature, or until reaching the boundaries of the image of an area of land; and outputting the grown network representative of the desired geospatial feature; whereby the outputs include the network of the grown geospatial feature, and any geometrical or spectral features extracted from the network of the grown geospatial feature.

81. A computer program product for automatically extracting geospatial features from multi-spectral imagery suitable for fast and robust extraction of landmarks evolved from a single seed point, the computer program product comprising means, stored on a computer readable medium for:

receiving an image of an area of land;

receiving a seed point, wherein said seed point represents a part of a desired geospatial feature of the area of land;

iteratively growing a region about the seed point based on a level set technique, with the region representative of the desired geospatial feature, and wherein the growing of the region results in a grown region having edges and a boundary;

appending a selected grown region to a network of grown geospatial features;

automatically reseeding a point on the image, wherein said reseeding point represents a potentially disjointed region of the desired geospatial feature of the area of land;

iteratively performing the means for growing a region about the seed point, the means for appending, and the means for reseeding, until either exhausting all likely candidates of potentially disjointed regions of the desired geospatial feature, or until reaching the boundaries of the image of an area of land; and outputting the network of grown geospatial features; whereby the outputs include the network of grown geospatial features, and any geometrical or spectral features extracted from the network of grown geospatial features.

82. A computer program product for automatically extracting geospatial features from multi-spectral imagery as set forth in claim 81, wherein in the means for receiving an image of an area of land, there are two types of input imagery consisting of multi-spectral input data, and panchromatic input data.

83. A computer program product for automatically extracting geospatial features from multi-spectral imagery as set forth in claim 82, where the multi-spectral input data and the panchromatic input data are used to create a pan-sharpened image, and wherein the pan-sharpened image preserves the details provided by the panchromatic data, while allowing for the exploitation of color information provided by the four-band color multi-spectral data.

84. A computer program product for automatically extracting geospatial features from multi-spectral imagery as set forth in claim 83, wherein in the means for receiving a seed point, the seed point is provided by a person using the computer program product for automatically extracting geospatial features from multispectral imagery, where said person using the computer program product is called "a user" and said received seed point is labeled "user-provided seed point".

85. A computer program product for automatically extracting geospatial features from multi-spectral imagery as set forth in claim 84, wherein, in the means for iteratively growing a region about the seed point, the region is grown using a level set technique, where the level set technique uses a speed function to control and stop the evolution of a growing region, and wherein the growing region has spectral uniformity and consistent texture.

86. A computer program product for automatically extracting geospatial features from multi-spectral imagery as set forth in claim 85, wherein, in the means for iteratively growing a region about the seed point based on a level set technique, the level set technique speed function is defined in terms of features that include at least one of: spectral uniformity; consistent texture; contrast with surrounding environment; Transformed Vegetative Index mask (TVI mask); and Water Index mask (WI mask).

87. A computer program product for automatically extracting geospatial features from multi-spectral imagery as set forth in claim 86, wherein the TVI mask is a measurement of light reflectance, with specific values for the TVI mask in regions with vegetation, and other specific values for the TVI mask in man made regions, and where the TVI mask is formed by combining near infrared and red color band information.

88. A computer program product for automatically extracting geospatial features from multi-spectral imagery as set forth in claim 87, wherein the WI mask is a measurement of light reflectance, with specific values for the WI mask in water regions, and other specific values for the WI mask in man made regions, and where the WI mask is formed by combining near infrared and green color band information.

89. A computer program product for automatically extracting geospatial features from multi-spectral imagery as set forth in claim 88, further comprising a means for iteratively smoothing the edges of the grown region based on a level set technique in order to eliminate boundary irregularities in a boundary of the grown region, wherein the level set technique uses a speed function to control and stop the evolution of a growing region around the boundary irregularities of the grown region, and wherein the smoothing of the grown region results in a smoothed grown region.

90. A computer program product for automatically extracting geospatial features from multi-spectral imagery as set forth in claim 89, wherein, in the means for iteratively smoothing the edges of the grown region, the speed function for the level set technique is defined in terms of a curvature measurement of the boundary of the grown region, wherein the boundary of the grown region has global properties that define an overall shape of the grown region, and wherein a finite number of iterations are performed in order to smooth out local irregularities in the boundary of the grown region, without changing the global properties of the boundary of the grown region.

91. A computer program product for automatically extracting geospatial features from multi-spectral imagery as set forth in claim 90, further comprising a means for filtering the smoothed grown region with respect to geometrical characteristics of the desired geospatial feature, wherein the filtering of the smoothed grown region results in a filtered grown region, and wherein the filtered grown region has connectivity properties.

92. A computer program product for automatically extracting geospatial features from multi-spectral imagery as set forth in claim 91, wherein the filtered grown region has a center line, and where the computer program product further comprises a means for computing the center line of the filtered grown region, wherein the center line preserves the connectivity properties of the filtered grown region.

93. A computer program product for automatically extracting geospatial features from multi-spectral imagery as set forth in claim 92, wherein, in the means for appending a selected grown region to a network of grown geospatial features, the selected grown region comprises the filtered grown region.

94. A computer program product for automatically extracting geospatial features from multi-spectral imagery as set forth in claim 93, wherein when the filtered grown region reaches a "dead end," the means for reseeding automatically searches an area about the "dead end" to find a new point in the image with similar characteristics to the user-provided seed point, in order to continue the growing of the region representative of the desired geospatial feature.

95. A computer program product for automatically extracting geospatial features from multi-spectral imagery as set forth in claim 94, wherein the centerline of the filtered grown region has an orientation, and wherein the search region about the "dead end" consists of a "cone shaped" search region with an orientation determined by the orientation of the centerline of the filtered grown region, as the centerline approaches the "dead end."

96. A computer program product for automatically extracting geospatial features from multi-spectral imagery as set forth in claim 95, wherein, in the means for reseeding, the characteristics used to compare the reseeding point with the user-provided seed point comprise: textural properties of the image at the reseeding point and textural properties of the image at the user-provided seed point; and distance from the reseeding point to an edge of a region grown out of the reseeding point, and distance from the user-provided seed point to an edge of the filtered grown region.

97. A computer program product for automatically extracting geospatial features from multi-spectral imagery as set forth in claim 96, further comprising a means for computing geometrical features of the network of grown geospatial features, wherein the network of grown geospatial features has branches, and wherein the geometrical features of the network include at least one of: centerlines, areas, lengths, widths, shapes, and roundness values of all the branches in the network.

98. A computer program product for automatically extracting geospatial features from multi-spectral imagery as set forth in claim 97, wherein in the means for filtering the smoothed grown region the desired geospatial features are roads, where the width and length of the smoothed grown regions are used as criteria for accepting or rejecting the smoothed grown regions as real roads or false roads, and wherein the filtered grown regions contain only real roads.

99. A computer program product for automatically extracting geospatial features from multi-spectral imagery as set forth in claim 98, further comprising the means for performing junction analysis, wherein filtered grown regions with centerlines that meet at appropriate angles within road intersections are accepted as real roads, and where filtered grown regions with centerlines that do not meet at appropriate angles within road intersections are considered false roads.

100. A computer program product for automatically extracting geospatial features from multi-spectral imagery as set forth in claim 99, further comprising a means for checking junctions of real roads for shape regularity, wherein intersecting real roads having similar road shape properties are automatically linked.

101. A computer program product for automatically extracting geospatial features from multi-spectral imagery as set forth in claim 100, wherein, in the means for growing a region about the seed point, the speed function for the level set technique, $F(x,y)$, is defined by $$F(x,y) = \left(we^{-\frac{1}{2}(\hat{c}(x,y)-\overline{\mu}_0)\Sigma^{-1}(\hat{c}(x,y)-\overline{\mu}_0)^T} + (1-w)e^{-|H(x,y)-H_0|}\right) *$$
$$\frac{1}{1+|\nabla I(x,y)|^p} * e^{-|TVI(x,y)-0.8|} * e^{-|WI(x,y)-0.9|}$$

where:
the first term of the speed function located to the right of the equal sign denotes a spectral uniformity of the grown region;
the second term of the speed function located to the right of the equal sign denotes a consistent texture of the grown region;
the third term of the speed function located to the right of the equal sign denotes contrast of the grown region with a surrounding environment;
the fourth term of the speed function located to the right of the equal sign hinders growth of the grown region into vegetation regions;
the last term of the speed function located to the right of the equal sign hinders growth of the grown region into water regions;
$\hat{c}(x,y)$ denotes spectral values of the image at $(x,y)$ location;
$\overline{\mu}_0$ represents a vector containing spectral intensities of the image at the user-provided seed point location;
$H(x,y)$ denotes an entropy value of the image at point $(x,y)$;
$H_0$ is an entropy value of the image at the user-provided seed point location;
parameter $w$ determines relative weightings between the spectral uniformity and the entropy terms representing the texture of the grown region;
$\nabla I$ term denotes an image gradient which extracts strong edges between the boundary of the grown region and other regions;
$\Sigma$ denotes a diagonal covariance matrix which is a function of noise present in the image, where $\Sigma$ allows for tuning the sensitivity of the spectral uniformity term; and
parameter $p$ is a function of contrast present in the image, where $p$ allows for tuning the sensitivity of the contrast term.

102. A computer program product for automatically extracting geospatial features from multi-spectral imagery as set forth in claim 101, wherein, in the means for iteratively smoothing the edges of the grown region, the grown region has a curvature value associated with its boundary, and wherein the curvature of the boundary of the grown region, $\kappa$, and the speed function, $F(x,y)$, are defined by $$\kappa = \frac{\Phi_{xx}\Phi_y^2 - 2\Phi_x\Phi_y\Phi_{xy} + \Phi_{yy}\Phi_x^2}{(\Phi_x^2 + \Phi_y^2)^{3/2}}$$

$$F(x,y) = -\min(\kappa(x,y),0)$$

where
$\Phi$ denotes a level set function defined by $\Phi(x,y)=\pm d(x,y)$, where $d(x,y)$ denotes smallest distance from a point $(x,y)$ within the image to the boundary of the grown region, and the +/− signs are chosen such that points inside the boundary have a negative distance sign, and such that points outside the boundary have a positive distance sign;
$\Phi_x$ denotes the partial derivative of $\Phi$ with respect to x coordinate;

$\Phi_y$ denotes the partial derivative of $\Phi$ with respect to y coordinate;

$\Phi_{xy}$ denotes the partial derivatives of $\Phi$ with respect to x and y coordinates;

$\Phi_{xx}$ denotes the partial derivatives of $\Phi$ with respect to x and x coordinates; and $\Phi_{yy}$ denotes the partial derivatives of $\Phi$ with respect to y and y coordinates.

103. A computer program product for automatically extracting geospatial features from multi-spectral imagery as set forth in claim 102, wherein, in the means for automatically reseeding a point on the image, the reseeding point is determined as a maximum likelihood point that lies within the "cone shaped" search region about the "dead end" that most closely satisfy $$SeedLH(x, y) = \text{Exp}\left\{-\left|\frac{\left(\frac{\sigma(x,y)+\sigma_0}{2}+\left(\frac{H(x,y)-H_0}{2}\right)^2\right)^2}{\sigma(x,y)*\sigma_0}-1\right|\right\}*$$

$$\text{Exp}\{-|edt(x,y)-d_0|\}$$

where

SeedLH(x,y) denotes likelihood of a point (x,y) of being an appropriate reseeding point representing a part of the desired geospatial feature of the area of land;

$\sigma(x,y)$ denotes variance associated with the image at point (x,y);

$\sigma_0$ denotes variance associated with the user-provided seed point;

H(x,y) denotes an entropy value of the image at point (x,y);

$H_0$ is an entropy value of the image at the user-provided seed point location;

edt(x,y) (Euclidean Distance Transform) denotes a Euclidean distance between a pixel point (x,y) and a nearest edge of a region grown out of the pixel point (x,y); and $d_0$ denotes estimated width of the previously filtered grown region which terminated on the "dead end" generating the current "cone shaped" search region.

104. A computer program product for automatically extracting geospatial features from multi-spectral imagery as set forth in claim 81, wherein in the means for receiving an image of an area of land, there are two types of input imagery consisting of multi-spectral input data, and panchromatic input data, and where the multi-spectral input data and the panchromatic input data are used to create a pan-sharpened image, wherein the pan-sharpened image preserves the details provided by the panchromatic data, while allowing for the exploitation of color information provided by the four-band color multi-spectral data.

105. A computer program product for automatically extracting geospatial features from multi-spectral imagery as set forth in claim 81, wherein in the means for receiving a seed point, the seed point is provided by either:

a person using the computer program product for automatically extracting geospatial features from multispectral imagery, where said person using the computer program product is called "a user" and said received seed point is labeled "user-provided seed point"; or a means for generating automatically a likely seed point representing a part of the desired geospatial feature of the area of land.

106. A computer program product for automatically extracting geospatial features from multi-spectral imagery as set forth in claim 81, wherein, in the means for iteratively growing a region about a seed point, the region is grown using a level set technique, where the level set technique uses a speed function to control and stop the evolution of a growing region, and wherein the speed function is defined in terms of features that include at least one of: spectral uniformity; consistent texture; contrast with surrounding environment; Transformed Vegetative Index mask (TVI mask); and Water Index mask (WI mask).

107. A computer program product for automatically extracting geospatial features from multi-spectral imagery as set forth in claim 81, wherein, in the means for iteratively growing a region about a seed point, the region is grown using a level set technique using a Transformed Vegetative Index mask (TVI mask) and Water Index mask (WI mask), where the TVI mask is formed by combining near infrared and red color band information, with specific values for the TVI mask in regions with vegetation, and other specific values for the TVI mask in man made regions, and where the WI mask is formed by combining near infrared and green color band information, with specific values for the WI mask in water regions, and other specific values for the WI mask in man made regions.

108. A computer program product for automatically extracting geospatial features from multi-spectral imagery as set forth in claim 81, further comprising a means for iteratively smoothing the edges of the grown region in order to eliminate boundary irregularities in a boundary of the grown region, wherein the means for smoothing is based on a level set technique using a speed function to control and stop the evolution of a growing region around the boundary irregularities of the grown region, and wherein the smoothing of the grown region results in a smoothed grown region.

109. A computer program product for automatically extracting geospatial features from multi-spectral imagery as set forth in claim 108, wherein, in the means for iteratively smoothing the edges of the grown region, the speed function for the level set technique is defined in terms of a curvature measurement of the boundary of the grown region, wherein the boundary of the grown region has global properties that define an overall shape of the grown region, and wherein a finite number of iterations are performed in order to smooth out local irregularities in the boundary of the grown region, without changing the global properties of the boundary of the grown region.

110. A computer program product for automatically extracting geospatial features from multi-spectral imagery as set forth in claim 109, wherein, in the means for iteratively smoothing the edges of the grown region, the grown region has a curvature value associated with its boundary, and wherein the curvature of the boundary of the grown region, $\kappa$, and the speed function, F(x,y), are defined by $$\kappa = \frac{\Phi_{xx}\Phi_y^2 - 2\Phi_x\Phi_y\Phi_{xy} + \Phi_{yy}\Phi_x^2}{(\Phi_x^2 + \Phi_y^2)^{3/2}}$$

$$F(x,y) = -\min(\kappa(x,y), 0)$$

where $\Phi$ denotes a level set function defined by $\Phi(x,y)=\pm d(x,y)$, where d(x,y) denotes smallest distance from a point (x,y) within the image to the boundary of the grown region, and the +/- signs are chosen such that points inside the boundary have a negative distance sign, and such that points outside the boundary have a positive distance sign;

$\Phi_x$ denotes the partial derivative of $\Phi$ with respect to x coordinate;

$\Phi_y$ denotes the partial derivative of $\Phi$ with respect to y coordinate;

$\Phi_{xy}$ denotes the partial derivatives of $\Phi$ with respect to x and y coordinates;

$\Phi_{xx}$ denotes the partial derivatives of $\Phi$ with respect to x and x coordinates; and $\Phi_{yy}$ denotes the partial derivatives of $\Phi$ with respect to y and y coordinates.

111. A computer program product for automatically extracting geospatial features from multi-spectral imagery as set forth in claim 81, further comprising a means for filtering the grown region with respect to geometrical characteristics of the desired geospatial feature, wherein the filtering of the grown region results in a filtered grown region, and wherein the filtered grown region has connectivity properties and a center line, where the center line preserves the connectivity properties of the filtered grown region.

112. A computer program product for automatically extracting geospatial features from multi-spectral imagery as set forth in claim 111, wherein, in the means for appending a selected grown region to a network of grown geospatial features, the selected grown region comprises the filtered grown region.

113. A computer program product for automatically extracting geospatial features from multi-spectral imagery as set forth in claim 111, wherein in the means for filtering the grown region the desired geospatial features are roads, where the width and length of the grown regions are used as criteria for accepting or rejecting the grown regions as real roads or false roads, and wherein the filtered grown regions contain only real roads.

114. A computer program product for automatically extracting geospatial features from multi-spectral imagery as set forth in claim 113, further comprising the means for:

performing junction analysis, wherein filtered grown regions with centerlines that meet at appropriate angles within road intersections are accepted as real roads, and where filtered grown regions with centerlines that do not meet at appropriate angles within road intersections are considered false roads; and checking junctions of real roads for shape regularity, wherein intersecting real roads having similar road shape properties are automatically linked and appended to a network of grown roads.

115. A computer program product for automatically extracting geospatial features from multi-spectral imagery as set forth in claim 81, wherein, in the means for automatically reseeding a point on the image, the selected grown region has a center line, with the center line having an orientation, and where the computer program product further comprises the means for:

computing the center line of the selected grown region; and when the selected grown region reaches a "dead end," searching an area about the "dead end" to find a new point in the image with similar characteristics to the initial seed point, in order to continue the growing of the region representative of the desired geospatial feature, and wherein the search region about the "dead end" consists of a "cone shaped" search region with an orientation determined by the orientation of the centerline of the selected grown region, as the centerline approaches the "dead end."

116. A computer program product for automatically extracting geospatial features from multi-spectral imagery as set forth in claim 81, wherein, in the means for reseeding, the characteristics used to compare the reseeding point with the initial seed point comprise: textural properties of the image at the reseeding point and textural properties of the image at the initial seed point; and distance from the reseeding point to an edge of a region grown out of the reseeding point, and distance from the initial seed point to an edge of the grown region.

117. A computer program product for automatically extracting geospatial features from multi-spectral imagery as set forth in claim 81, further comprising a means for computing geometrical features of the network of grown geospatial features, wherein the network of grown geospatial features has branches, and wherein the geometrical features of the network include at least one of: centerlines, areas, lengths, widths, shapes, and roundness values of all the branches in the network.

118. A computer program product for automatically extracting geospatial features from multi-spectral imagery as set forth in claim 81, wherein, in the means for growing a region about the seed point, the region is grown using a level set technique that utilizes a speed function F(x,y) defined by $$F(x, y) = \left( we^{-\frac{1}{2}(\hat{c}(x,y)-\overline{\mu}_0)\Sigma^{-1}(\hat{c}(x,y)-\overline{\mu}_0)^T} + (1-w)e^{-|H(x,y)-H_0|} \right) * \frac{1}{1+|\nabla I(x, y)|^p} * e^{-|TVI(x,y)-0.8|} * e^{-|WI(x,y)-0.9|}$$

where:

the first term of the speed function located to the right of the equal sign denotes a spectral uniformity of the grown region;

the second term of the speed function located to the right of the equal sign denotes a consistent texture of the grown region;

the third term of the speed function located to the right of the equal sign denotes contrast of the grown region with a surrounding environment;

the fourth term of the speed function located to the right of the equal sign hinders growth of the grown region into vegetation regions;

the last term of the speed function located to the right of the equal sign hinders growth of the grown region into water regions;

$\hat{c}(x,y)$ denotes spectral values of the image at (x,y) location;

$\overline{\mu}_0$ represents a vector containing spectral intensities of the image at the user-provided seed point location;

H(x,y) denotes an entropy value of the image at point (x,y);

$H_0$ is an entropy value of the image at the user-provided seed point location;

parameter w determines relative weightings between the spectral uniformity and the entropy terms representing the texture of the grown region;

$\nabla I$ term denotes an image gradient which extracts strong edges between the boundary of the grown region and other regions;

$\Sigma$ denotes a diagonal covariance matrix which is a function of noise present in the image, where $\Sigma$ allows for tuning the sensitivity of the spectral uniformity term; and parameter p is a function of contrast present in the image, where p allows for tuning the sensitivity of the contrast term.

119. A computer program product for automatically extracting geospatial features from multi-spectral imagery as set forth in claim 81, wherein, in the means for automatically reseeding a point on the image, when a selected grown region reaches a "dead end," the reseeding point is determined as a maximum likelihood point that lies within a "cone shaped" search region about the "dead end" that most closely satisfy $$SeedLH(x, y) = \text{Exp}\left\{-\left|\frac{\left(\frac{\sigma(x,y)+\sigma_0}{2}+\left(\frac{H(x,y)-H_0}{2}\right)^2\right)^2}{\sigma(x,y)*\sigma_0}-1\right|\right\} * \text{Exp}\{-|edt(x,y)-d_0|\}$$

where
- SeedLH(x,y) denotes likelihood of a point (x,y) of being an appropriate reseeding point representing a part of the desired geospatial feature of the area of land;
- $\sigma(x,y)$ denotes variance associated with the image at point (x,y);
- $\sigma_0$ denotes variance associated with the initial seed point;
- H(x,y) denotes an entropy value of the image at point (x,y);
- $H_0$ is an entropy value of the image at the initial seed point location;
- edt(x,y) (Euclidean Distance Transform) denotes a Euclidean distance between a pixel point (x,y) and a nearest edge of a region grown out of the pixel point (x,y); and
- $d_0$ denotes estimated width of the previously selected grown region which terminated on the "dead end" generating the current "cone shaped" search region.

120. A computer program product for automatically extracting geospatial features from multi-spectral imagery suitable for fast and robust extraction of landmarks evolved from a single seed point, the computer program product comprising means for:

receiving an image of an area of land;

generating automatically likely seed points representing a part of a desired geospatial feature of the area of land;

iteratively growing a region about the seed point based on a level set technique, with the region representative of the desired geospatial feature, and wherein the growing of the region results in a grown region having edges and a boundary;

appending a selected grown region to a network of grown geospatial features;

automatically reseeding a point on the image, wherein said reseeding point represents a potentially disjointed region of the desired geospatial feature of the area of land;

iteratively performing the means for growing a region about the seed point, appending, and reseeding, until either exhausting all likely candidates of potentially disjointed regions of the desired geospatial feature, or until reaching the boundaries of the image of an area of land; and outputting the grown network representative of the desired geospatial feature; whereby the outputs include the network of the grown geospatial feature, and any geometrical or spectral features extracted from the network of the grown geospatial feature.

* * * * *